US008562415B2

(12) United States Patent
Gail et al.

(10) Patent No.: US 8,562,415 B2
(45) Date of Patent: Oct. 22, 2013

(54) PROVIDING NON-BINGO OUTCOMES FOR A BINGO GAME

(75) Inventors: Ted Gail, Sparks, NV (US); Mark Bansemer, Reno, NV (US); Bryan Wolf, Reno, NV (US)

(73) Assignee: IGT, Las Vegas, NV (US)

( * ) Notice: Subject to any disclaimer, the term of this patent is extended or adjusted under 35 U.S.C. 154(b) by 96 days.

(21) Appl. No.: 13/092,675

(22) Filed: Apr. 22, 2011

(65) Prior Publication Data

US 2011/0212759 A1 Sep. 1, 2011

Related U.S. Application Data

(63) Continuation of application No. 10/969,127, filed on Oct. 19, 2004, now Pat. No. 7,955,170.

(60) Provisional application No. 60/592,410, filed on Jul. 30, 2004.

(51) Int. Cl.
*A63F 3/06* (2006.01)
*G06F 17/30* (2006.01)

(52) U.S. Cl.
USPC .................... 463/19; 463/16; 463/43; 710/54

(58) Field of Classification Search
USPC ............................ 463/16–20, 43; 710/52–54
See application file for complete search history.

(56) References Cited

U.S. PATENT DOCUMENTS

| | | | |
|---|---|---|---|
| 1,723,377 | A | 8/1929 | Salomon |
| 3,618,952 | A | 11/1971 | Tallarida |
| 3,628,259 | A | 12/1971 | Kahn |
| 4,156,976 | A | 6/1979 | Mikun |
| 4,157,829 | A | 6/1979 | Goldman et al. |
| 4,332,389 | A | 6/1982 | Loyd, Jr. et al. |
| 4,335,809 | A | 6/1982 | Wain |

(Continued)

FOREIGN PATENT DOCUMENTS

| | | |
|---|---|---|
| EP | 0 199 690 | 10/1986 |
| EP | 0769769 A1 | 4/1997 |

(Continued)

OTHER PUBLICATIONS

US Office Action dated Jul. 2, 2009 issued in U.S. Appl. No. 10/925,710.

(Continued)

*Primary Examiner* — Damon Pierce
(74) *Attorney, Agent, or Firm* — Neal, Gerber & Eisenberg LLP

(57) ABSTRACT

The present invention provides methods and devices for providing a first wagering game (such as a bingo game) that presents a changing pool of displayed game outcomes for a second wagering game (such as a Class III game), preferably on a network of gaming machines. Some implementations of the invention provide a bingo game that presents a changing pool of displayed game outcomes for a slot game or a poker game. In some preferred implementations, game outcomes are generated, e.g., by individual gaming machines, on an ongoing basis and stored in memory. Each of the game outcomes corresponds with a bingo outcome. Preferably, the game outcomes are sorted and stored according to payout amounts for various bingo outcomes. In some implementations, the game outcomes are stored in the form of random number generating ("RNG") seeds, but in other implementations the game outcomes are stored in a variety of other forms.

21 Claims, 9 Drawing Sheets

(56) References Cited

U.S. PATENT DOCUMENTS 4,339,798 A 7/1982 Hedges et al.
4,364,567 A 12/1982 Goott
4,365,810 A 12/1982 Richardson
4,371,169 A 2/1983 Compton
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,560,171 A 12/1985 Anthony
4,582,324 A 4/1986 Koza et al.
4,624,462 A 11/1986 Itkis
4,652,998 A 3/1987 Koza et al.
4,669,730 A 6/1987 Small
4,689,742 A 8/1987 Troy et al.
4,743,022 A 5/1988 Wood
4,760,527 A 7/1988 Sidley
4,798,387 A 1/1989 Richardson
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis
4,982,337 A 1/1991 Burr et al.
5,007,649 A 4/1991 Richardson
5,011,159 A 4/1991 Fortunato et al.
5,042,809 A 8/1991 Richardson
5,078,403 A 1/1992 Chernowski, Jr.
5,092,598 A 3/1992 Kamille
5,100,137 A 3/1992 Fulton
5,100,139 A 3/1992 Di Bella
5,145,182 A 9/1992 Swift et al.
5,158,293 A 10/1992 Mullins
5,167,413 A 12/1992 Fulton
5,224,706 A 7/1993 Bridgeman et al.
5,242,163 A 9/1993 Fulton
5,265,874 A 11/1993 Dickinson et al.
5,275,400 A 1/1994 Weingardt et al.
5,276,312 A 1/1994 McCarthy
5,282,620 A 2/1994 Keesee
5,294,120 A 3/1994 Schultz
5,294,128 A 3/1994 Marquez
5,297,802 A 3/1994 Pocock et al.
5,324,035 A 6/1994 Morris et al.
5,351,970 A 10/1994 Fioretti
5,356,140 A 10/1994 Dabrowski et al.
5,393,057 A 2/1995 Marnell, II
5,398,932 A 3/1995 Eberhardt et al.
5,401,023 A 3/1995 Wood
5,407,199 A 4/1995 Gumina
5,482,289 A 1/1996 Weingardt
5,489,101 A 2/1996 Moody
5,511,781 A 4/1996 Wood et al.
5,531,448 A 7/1996 Moody
5,542,669 A 8/1996 Charron et al.
5,570,885 A 11/1996 Ornstein
5,584,486 A 12/1996 Franklin
5,588,913 A 12/1996 Hecht
5,593,161 A 1/1997 Boylan et al.
5,601,287 A 2/1997 Lundin
5,628,684 A 5/1997 Bouedec
5,630,754 A 5/1997 Rebane
5,639,088 A 6/1997 Schneider et al.
5,674,128 A 10/1997 Holch et al.
5,678,001 A 10/1997 Nagel et al.
5,707,285 A 1/1998 Place et al.
5,709,603 A 1/1998 Kaye
5,711,715 A 1/1998 Ringo et al.
5,718,431 A 2/1998 Ornstein
5,722,891 A 3/1998 Inoue
5,732,950 A 3/1998 Moody
5,755,619 A 5/1998 Matsumoto et al.
5,762,552 A 6/1998 Vuong et al.
5,775,692 A 7/1998 Watts et al.
5,779,545 A 7/1998 Berg et al.
5,791,987 A 8/1998 Chen et al.
5,800,269 A 9/1998 Holch et al.
5,816,916 A 10/1998 Moody
5,823,873 A 10/1998 Moody
5,823,874 A 10/1998 Adams
5,833,537 A 11/1998 Barrie
5,833,540 A 11/1998 Miodunski et al.
5,848,932 A 12/1998 Adams
5,851,011 A 12/1998 Lott
5,868,619 A 2/1999 Wood et al.
5,871,398 A 2/1999 Schneier et al.
5,882,258 A 3/1999 Kelly et al.
5,882,260 A 3/1999 Marks et al.
5,944,606 A 8/1999 Gerow
5,949,042 A 9/1999 Dietz et al.
5,951,396 A 9/1999 Tawil
5,954,335 A 9/1999 Moody
5,954,582 A 9/1999 Zach
5,976,016 A 11/1999 Moody et al.
5,984,310 A 11/1999 English
5,984,779 A 11/1999 Bridgeman et al.
6,007,066 A 12/1999 Moody
6,007,424 A 12/1999 Evers et al.
6,012,720 A 1/2000 Webb
6,012,981 A 1/2000 Fujioka et al.
6,012,984 A 1/2000 Roseman
6,017,032 A 1/2000 Grippo et al.
6,024,640 A 2/2000 Walker et al.
6,062,980 A 5/2000 Luciano
6,079,711 A 6/2000 Wei et al.
6,089,982 A 7/2000 Holch et al.
6,093,100 A 7/2000 Singer et al.
6,098,985 A 8/2000 Moody
6,120,378 A 9/2000 Moody et al.
6,126,541 A 10/2000 Fuchs
6,126,542 A 10/2000 Fier
6,132,311 A 10/2000 Williams
6,146,271 A 11/2000 Kadlic
6,146,272 A 11/2000 Walker et al.
6,149,156 A 11/2000 Feola
6,149,521 A 11/2000 Sanduski
6,159,095 A 12/2000 Frohm et al.
6,168,521 B1 1/2001 Luciano et al.
6,174,233 B1 1/2001 Sunaga et al.
6,183,361 B1 2/2001 Cummings et al.
6,190,255 B1 2/2001 Thomas et al.
6,196,547 B1 3/2001 Pascal et al.
6,203,429 B1 3/2001 Demar et al.
6,210,275 B1 4/2001 Olsen
6,210,276 B1 4/2001 Mullins
6,217,448 B1 4/2001 Olsen
6,220,961 B1 4/2001 Keane et al.
6,241,606 B1 6/2001 Riendeau et al.
6,254,480 B1 7/2001 Zach
6,257,980 B1 7/2001 Santini, Jr.
6,273,424 B1 8/2001 Breeding
6,273,820 B1 8/2001 Haste, III
6,280,325 B1 8/2001 Fisk
6,280,328 B1 8/2001 Holch et al.
6,309,298 B1 10/2001 Gerow
6,312,334 B1 11/2001 Yoeloff
6,325,716 B1 12/2001 Walker et al.
6,358,151 B1 3/2002 Enzminger et al.
6,368,218 B2 4/2002 Angell, Jr.
6,394,456 B1 5/2002 Long
6,398,645 B1 6/2002 Yoseloff
6,402,614 B1 6/2002 Schneier et al.
6,419,583 B1 7/2002 Crumby et al.
6,425,824 B1 7/2002 Baerlocher et al.
6,450,885 B2 9/2002 Schneier et al.
6,454,648 B1 9/2002 Kelly et al.
RE37,885 E 10/2002 Acres et al.
6,475,086 B2 11/2002 Zach
6,494,454 B2 12/2002 Adams
6,508,711 B1 1/2003 Ono
6,511,068 B1 1/2003 Sklansky et al.
6,524,184 B1 2/2003 Lind et al.
6,524,185 B2 2/2003 Lind

(56) References Cited

U.S. PATENT DOCUMENTS

| | | | |
|---|---|---|---|
| 6,527,638 | B1 | 3/2003 | Walker et al. |
| 6,533,664 | B1 | 3/2003 | Crumby |
| 6,537,150 | B1 | 3/2003 | Luciano et al. |
| 6,554,283 | B2 | 4/2003 | Vancura et al. |
| 6,568,677 | B2 | 5/2003 | Brenner |
| 6,569,017 | B2 | 5/2003 | Enzminger et al. |
| 6,575,467 | B1 | 6/2003 | Kal |
| 6,585,266 | B1 | 7/2003 | Lovell |
| 6,585,590 | B2 | 7/2003 | Malone |
| 6,599,187 | B2 | 7/2003 | Gerow |
| 6,607,439 | B2 | 8/2003 | Schneier et al. |
| 6,609,974 | B2 | 8/2003 | Mead et al. |
| 6,612,927 | B1 | 9/2003 | Slomiany et al. |
| 6,619,660 | B2 | 9/2003 | Schaefer et al. |
| 6,656,044 | B1 | 12/2003 | Lewis |
| 6,676,126 | B1 | 1/2004 | Walker et al. |
| 6,685,562 | B1 | 2/2004 | Rantanen |
| 6,695,695 | B2 | 2/2004 | Angel |
| 6,722,655 | B1 | 4/2004 | Camero |
| 6,729,621 | B2 | 5/2004 | Moody |
| 6,729,961 | B1 | 5/2004 | Millerschone |
| 6,733,385 | B1 | 5/2004 | Enzminger et al. |
| 6,739,970 | B2 | 5/2004 | Luciano |
| 6,743,102 | B1 | 6/2004 | Fiechter et al. |
| 6,749,500 | B1 | 6/2004 | Nelson et al. |
| 6,780,108 | B1 | 8/2004 | Luciano et al. |
| 6,802,776 | B2 | 10/2004 | Lind et al. |
| 6,802,778 | B1 | 10/2004 | Lemay et al. |
| 6,805,629 | B1 | 10/2004 | Weiss |
| 6,840,858 | B2 | 3/2005 | Yarbrough |
| 6,874,784 | B1 | 4/2005 | Promutico et al. |
| 6,918,831 | B2 | 7/2005 | Nguyen et al. |
| 6,923,719 | B2 | 8/2005 | Wolf |
| 6,932,707 | B2 | 8/2005 | Duhamel |
| 7,059,966 | B2 | 6/2006 | Luciano, Jr. et al. |
| 7,128,647 | B2 | 10/2006 | Muir |
| 7,481,707 | B1 | 1/2009 | Luciano et al. |
| 7,955,170 | B2 | 6/2011 | Gail et al. |
| 8,047,913 | B2 | 11/2011 | Moshal |
| 8,057,292 | B2 | 11/2011 | Gail et al. |
| 8,123,606 | B2 | 2/2012 | Hollibaugh et al. |
| 8,287,354 | B2 | 10/2012 | Gail et al. |
| 2001/0036855 | A1 | 11/2001 | DeFrees-Parrott et al. |
| 2001/0046892 | A1 | 11/2001 | Santini, Jr. |
| 2002/0010013 | A1 | 1/2002 | Walker et al. |
| 2002/0094869 | A1 | 7/2002 | Harkham |
| 2002/0098882 | A1 | 7/2002 | Lind et al. |
| 2002/0098883 | A1 | 7/2002 | Packes, Jr. et al. |
| 2002/0111207 | A1 | 8/2002 | Lind et al. |
| 2002/0113369 | A1 | 8/2002 | Weingardt |
| 2002/0132661 | A1 | 9/2002 | Lind et al. |
| 2002/0155877 | A1 | 10/2002 | Enzminger et al. |
| 2002/0196342 | A1 | 12/2002 | Walker et al. |
| 2003/0060257 | A1 | 3/2003 | Katz et al. |
| 2003/0060261 | A1 | 3/2003 | Katz et al. |
| 2003/0060276 | A1 | 3/2003 | Walker et al. |
| 2003/0098544 | A1 | 5/2003 | Tarantino |
| 2003/0125101 | A1 | 7/2003 | Campo |
| 2003/0127793 | A1 | 7/2003 | Adams |
| 2003/0144050 | A1 | 7/2003 | Keaton et al. |
| 2003/0162577 | A1 | 8/2003 | Hamud |
| 2003/0181231 | A1 | 9/2003 | Vancura et al. |
| 2003/0190943 | A1 | 10/2003 | Walker et al. |
| 2003/0216165 | A1 | 11/2003 | Singer et al. |
| 2003/0228899 | A1 | 12/2003 | Evans |
| 2003/0236116 | A1 | 12/2003 | Marks et al. |
| 2004/0009806 | A1 | 1/2004 | Odom |
| 2004/0023706 | A1 | 2/2004 | Hunter et al. |
| 2004/0036212 | A1 | 2/2004 | Walker et al. |
| 2004/0038723 | A1 | 2/2004 | Schneier et al. |
| 2004/0053675 | A1 | 3/2004 | Nguyen et al. |
| 2004/0072604 | A1 | 4/2004 | Toyoda |
| 2004/0072605 | A1 | 4/2004 | Toyoda |
| 2004/0077400 | A1 | 4/2004 | Marshall |
| 2004/0132523 | A1 | 7/2004 | Staw |
| 2004/0142747 | A1 | 7/2004 | Pryzby |
| 2004/0152503 | A1 | 8/2004 | Lind et al. |
| 2004/0152505 | A1 | 8/2004 | Herrmann et al. |
| 2004/0152508 | A1 | 8/2004 | Lind et al. |
| 2004/0166920 | A1 | 8/2004 | Boyd et al. |
| 2004/0185932 | A1 | 9/2004 | Lombardo |
| 2004/0219969 | A1 | 11/2004 | Casey et al. |
| 2004/0235542 | A1 | 11/2004 | Stronach et al. |
| 2004/0235555 | A1 | 11/2004 | Yarbrough et al. |
| 2004/0259621 | A1 | 12/2004 | Pfeiffer et al. |
| 2004/0266507 | A1 | 12/2004 | Cooper |
| 2005/0026665 | A1 | 2/2005 | Gerrard et al. |
| 2005/0037832 | A1 | 2/2005 | Cannon |
| 2005/0037834 | A1 | 2/2005 | Stern et al. |
| 2005/0054426 | A1 | 3/2005 | Toyoda |
| 2005/0059449 | A1 | 3/2005 | Yarbrough |
| 2005/0059469 | A1 | 3/2005 | Gail et al. |
| 2005/0059470 | A1* | 3/2005 | Cannon ........................... 463/19 |
| 2005/0059471 | A1 | 3/2005 | Cannon |
| 2005/0096130 | A1 | 5/2005 | Mullins |
| 2005/0098944 | A1 | 5/2005 | Brandstetter |
| 2005/0101387 | A1 | 5/2005 | Wolf |
| 2005/0167916 | A1 | 8/2005 | Banyai |
| 2005/0221883 | A1 | 10/2005 | Lind et al. |
| 2005/0233798 | A1 | 10/2005 | Van Asdale et al. |
| 2006/0025189 | A1 | 2/2006 | Hollibaugh et al. |
| 2006/0025198 | A1 | 2/2006 | Gail et al. |
| 2006/0025199 | A1 | 2/2006 | Harkins et al. |
| 2006/0217176 | A1 | 9/2006 | Walker et al. |
| 2007/0093286 | A1 | 4/2007 | Marshall |
| 2007/0135211 | A1 | 6/2007 | Block et al. |
| 2007/0142113 | A1 | 6/2007 | Walker et al. |
| 2008/0070663 | A1 | 3/2008 | Losilevsky |
| 2012/0028696 | A1 | 2/2012 | Gail et al. |
| 2012/0108310 | A1 | 5/2012 | Hollibaugh et al. |

FOREIGN PATENT DOCUMENTS

| | | | |
|---|---|---|---|
| EP | 1 302 914 | | 4/2003 |
| EP | 1 341 135 | | 9/2003 |
| EP | 1 343 125 | | 9/2003 |
| JP | 2001-161888 | A | 6/2001 |
| JP | 2003-225461 | A | 8/2003 |
| JP | 2004-130122 | A | 4/2004 |
| WO | WO 96/18174 | | 6/1996 |
| WO | WO 01/99067 | | 12/2001 |
| WO | WO 03/063019 | | 7/2003 |
| WO | WO2004/095383 | A1 | 11/2004 |

OTHER PUBLICATIONS

US Office Action Final dated Feb. 28, 2011 issued in U.S. Appl. No. 10/925,710.

US Office Action dated Dec. 2, 2009 issued in U.S. Appl. No. 11/149,828.

US Office Action dated May 27, 2010 issued in U.S. Appl. No. 11/149,828.

US Office Action Final dated Oct. 26, 2010 issued in U.S. Appl. No. 11/149,828.

US Office Action (Notice of Panel Decision from Pre-Appeal Brief Review) dated Mar. 3, 2011 issued in U.S. Appl. No. 11/149,828.

US Office Action dated Jun. 27, 2007 issued in U.S. Appl. No. 11/026,860.

US Office Action dated Dec. 21, 2007 issued in U.S. Appl. No. 11/026,860.

US Office Action dated Jul. 9, 2008 issued in U.S. Appl. No. 11/026,860.

US Office Action dated Apr. 8, 2009 issued in U.S. Appl. No. 11/026,860.

U.S. Office Action dated Apr. 29, 2008 issued in U.S. Appl. No. 11/031,048.

US Office Action dated Nov. 12, 2008 issued in U.S. Appl. No. 11/031,048.

US Office Action dated Jun. 12, 2009 issued in U.S. Appl. No. 11/031,048.

US Office Action dated Apr. 26, 2010 issued in U.S. Appl. No. 11/031,048.

(56) References Cited

OTHER PUBLICATIONS

US Office Action (Notice of Panel Decision from Pre-Appeal Brief Review) dated May 9, 2011 issued in U.S. Appl. No. 11/031,048.
US Office Action Final dated Dec. 10, 2010 issued in U.S. Appl. No. 11/031,048.
US Office Action dated Mar. 17, 2008 issued in U.S. Appl. No. 10/937,227.
US Office Action dated Nov. 17, 2008 issued in U.S. Appl. No. 10/937,227.
US Final Office Action dated Jun. 17, 2009 issued in U.S. Appl. No. 10/937,227.
US Office Action dated Jan. 12, 2010 issued in U.S. Appl. No. 10/937,227.
US Office Action dated Jul. 13, 2010 issued in U.S. Appl. No. 10/937,227.
US Notice of Abandonment dated Mar. 4, 2011 issued in U.S. Appl. No. 10/937,227.
US Office Action dated Sep. 12, 2007 issued in U.S. Appl. No. 10/969,127.
US Examiner Interview Summary Record dated Jan. 24, 2008 issued in U.S. Appl. No. 10/969,127.
US Final Office Action dated Apr. 3, 2008 issued in U.S. Appl. No. 10/969,127.
US Office Action dated Sep. 16, 2008 issued in U.S. Appl. No. 10/969,127.
US Final Office Action dated Apr. 3, 2009 issued in U.S. Appl. No. 10/969,127.
US Pre-Brief Appeal Conference Decision dated Aug. 21, 2009 issued in U.S. Appl. No. 10/969,127.
US Examiner Interview Summary Record dated Sep. 4, 2009 issued in U.S. Appl. No. 10/969,127.
US Office Action dated Dec. 22, 2009 issued in U.S. Appl. No. 10/969,127.
US Examiner Interview Summary Record dated Mar. 31, 2010 issued in U.S. Appl. No. 10/969,127.
US Final Office Action dated Jul. 2, 2010 issued in U.S. Appl. No. 10/969,127.
US Notice of Allowance and Examiner's Interview Summary dated Mar. 28, 2011 issued in U.S. Appl. No. 10/969,127.
US Restriction Requirement mailed Jun. 8, 2007 issued in U.S. Appl. No. 10/931,673.
US Office Action dated Aug. 20, 2007, from U.S. Appl. No. 10/931,673.
US Office Action mailed Sep. 13, 2007 from U.S. Appl. No. 10/941,606.
US Office Action mailed Jul. 3, 2007, from U.S. Appl. No. 10/755,982.
US Office Action dated Sep. 21, 2007 issued in U.S. Appl. No. 10/756,429.
EP Examiner's Communication dated Jul. 3, 2006 issued in EP App No. 04783935.2.
EP Examination Report dated Oct. 22, 2007 issued in EP No. 04 788 725.2.
EP Examiner's Communication dated Oct. 25, 2006 issued in EP App No. 04784069.9.
PCT International Search Report and Written Opinion dated Feb. 3, 2005 issued in PCT/US2004/030285.
PCT International Search Report and Written Opinion dated Jan. 24, 2005 issued in PCT/US2004/030093.
EP Examiner's Communication dated Jul. 3, 2006 issued in EP App No. 04784071.5.
PCT International Search Report and Written Opinion dated Feb. 3, 2005 issued in PCT/US2004/029839.
International Search Report & Written Opinion dated Jan. 11, 2005 issued in PCT/US2004/029912.
PCT International Search Report and Written Opinion dated Jul. 4, 2007 issued in PCT/US2006/047714.
PCT International Search Report dated Jun. 6, 2007 issued in PCT/US2006/048264.
PCT Written Opinion dated Jun. 6, 2007 issued in PCT/US2006/048264.
PCT International Search Report and Written Opinion dated Jan. 24, 2005 issued in PCT/US2004/029906.
PCT International Search Report and Written Opinion dated Jan. 25, 2005 issued in PCT/US2004/029913.
Aho et al., (1983) "Data Structures and Algorithms", Addison-Wesley, 13-16, 56-57, 260-261 and 367.
Diamonopoly Advertisement by International Gamco, Inc. (2002); Electronic Tabs Advertisement by 21st Century Gaming (2002).
Lucky Times California Lottery Newsletter published 1996; Instant Winner Advertisement by Williams/WMS Gaming, published prior to 2002.
Play it again Advertisement by International Gamco, Inc. (2000).
Encyclopedia > Suit (cards) NationMaster.com [online], [retrieved on Apr. 7, 2010]. Retrieved from the Internet <URL:http:www.statemaster.com/encyclopedia/Suit-(cards)>, 9 pages.
US Notice of Allowance dated Jun. 27, 2011 issued in U.S. Appl. No. 10/925,710.
US Office Action (Response to Rule 312 Communication) dated Jul. 27, 2011 issued in U.S. Appl. No. 10/925,710.
US Office Action dated Jan. 20, 2012 issued in U.S. Appl. No. 13/246,142.
US Notice of Allowance dated Jun. 12, 2012 issued in U.S. Appl. No. 13/246,142.
US Notice of Allowance dated Aug. 21, 2012 issued in U.S. Appl. No. 13/246,142.
US Office Action dated May 31, 2011 issued in U.S. Appl. No. 11/031,048.
US Notice of Allowance and Examiner Interview Summary dated Oct. 11, 2011 issued in U.S. Appl. No. 11/031,048.
Third Party Submission for U.S. Appl. No. 13/347,591 dated Jul. 2, 2012.
Third Party Submission for U.S. Appl. No. 13/092,675 dated Oct. 31, 2011.

* cited by examiner

PROVIDING NON-BINGO OUTCOMES FOR A BINGO GAME

CROSS-REFERENCE TO RELATED APPLICATIONS

This application is a continuation of U.S. application Ser. No. 10/969,127, entitled "PROVIDING NON-BINGO OUTCOMES FOR A BINGO GAME" and filed Oct. 19, 2004 now U.S. Pat. No. 7,955,170, which is hereby incorporated by reference and for all purposes and which claims priority to U.S. Provisional Patent Application No. 60/592,410, entitled "Draw Bingo" and filed Jul. 30, 2004, which is hereby incorporated by reference and for all purposes.

BACKGROUND OF THE INVENTION

The present disclosure relates to gaming networks and, more particularly, to a gaming network providing a multi-player wagering game, such as a bingo game.

Gaming in the United States is divided into Class I, Class II and Class III games. Class I gaming includes social games played for minimal prizes, or traditional ceremonial games. Class II gaming includes bingo and bingo-like games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

As indicated above, a bingo game is played until at least one player covers a predetermined game-winning pattern on the player's bingo card. The game may also include interim winners of prizes based on matching predetermined interim patterns on the bingo card using the same ball draw. The interim pattern wins do not terminate the bingo game. For interim pattern awards, players covering certain interim patterns may receive an additional award as the game continues. Some exceptional bingo versions may allow bingo draws beyond those needed to achieve the bingo game win so as to pay out interim pattern wins at a desired rate. The game-winning awards are generally pari-mutuel in nature. That is, the bingo win award is based upon the total amount wagered on a given occurrence of the bingo game. However, interim pattern awards typically are not pari-mutuel.

Gaming machines such as slot machines and video poker machines have proven to be very popular. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo.

As such, it would be desirable to provide a gaming system wherein a Class II game may be played on a gaming machine with at least some of the "look and feel" of a Class III game, such as a slot game or a card game. Although some gaming systems currently in existence display a Class III game outcome that corresponds with a bingo game outcome and/or payout amount, they are not fully satisfactory.

For example, many such gaming systems provide only a relatively small number of displayed Class III game outcomes for a corresponding Class II game outcome or payout amount. Moreover, the displayed Class III outcomes are often presented in a predictable sequence. If a player realizes that the displayed Class III outcomes are presented in a predictable sequence, the presentations of Class III game outcomes do not sustain the impression of being truly random outcomes.

SUMMARY OF THE INVENTION

The present invention provides methods and devices for providing a first wagering game (such as a Class II game) that presents a changing pool of displayed game outcomes for a second wagering game (such as a Class III game), preferably on a network of gaming machines. Some implementations of the invention provide a bingo game that presents a changing pool of displayed game outcomes for a slot game or a poker game. In some preferred implementations, game outcomes are generated, e.g., by individual gaming machines, on an ongoing basis and stored in memory. Each of the game outcomes corresponds with a bingo outcome. Preferably, the game outcomes are sorted and stored according to payout amounts for various bingo outcomes. In some implementations, the game outcomes are stored in the form of random number generating ("RNG") seeds, but in other implementations the game outcomes are stored in a variety of other forms.

Some aspects of the invention provide a gaming method that includes the following steps: generating a first plurality of non-bingo game outcomes corresponding to a first payout level of a bingo game; generating a second plurality of non-bingo game outcomes corresponding to a second payout level of a bingo game; saving the first plurality of non-bingo game outcomes in a first area of a local memory of a gaming machine operable to receive an input of cash or indicia of credit for wagers on games of chance and to control an output of cash or indicia of credit from the gaming machine; and saving the second plurality of non-bingo game outcomes in a second area of the local memory of the gaming machine, wherein the saving steps comprise replacing non-bingo game outcomes previously stored in the local memory.

Alternative aspects of the invention provide another gaming method that includes these steps: creating a queue of memory addresses for each payout amount of a bingo game; creating a plurality of non-bingo game outcomes; sorting the plurality of non-bingo game outcomes according to payout amounts of the bingo game; adding non-bingo game outcomes to the proper queues according to payout amount; determining when the queues contain sufficient non-bingo game outcomes to enable game play; and enabling game play when the queues contain sufficient non-bingo game outcomes.

Other aspects of the invention provide another gaming method that includes these steps: creating a queue of memory addresses for each payout amount of a bingo game; initializing start and end pointers to the first and last entries in each queue; creating a plurality of non-bingo game outcomes; sorting the plurality of non-bingo game outcomes according to payout amounts of the bingo game; adding non-bingo game outcomes to the proper queues according to payout amount; determining when the queues contain sufficient non-bingo game outcomes to enable game play; enabling bingo game play when the queues contain sufficient non-bingo game outcomes; selecting non-bingo game outcomes corresponding to bingo payout amounts by reference to the start pointers; incrementing the start pointers from selected non-bingo game outcomes; and replacing selected non-bingo game outcomes with created non-bingo game outcomes.

Still other aspects of the invention provide an alternative gaming method that includes the following steps: creating a queue of memory addresses for each payout amount of a first wagering game; initializing start and end pointers to the first and last entries in each queue; creating a plurality of second wagering game outcomes for a second wagering game different from the first wagering game; sorting the plurality of second wagering game outcomes according to payout amounts of the first wagering game; adding second wagering game outcomes to the proper queues according to payout amount; determining when the queues contain sufficient second wagering game outcomes to enable game play; enabling first wagering game play when the queues contain sufficient second wagering game outcomes; selecting second game outcomes corresponding to first wagering game payout amounts by reference to the start pointers; incrementing the start pointers from selected second wagering game outcomes; and replacing selected second wagering game outcomes with created second wagering game outcomes.

All of the foregoing methods, along with other methods of the present invention, may be implemented by software, firmware and/or hardware. For example, the methods of the present invention may be implemented by computer programs embodied in machine-readable media.

Some such implementations of the invention provide a computer program stored in a machine-readable medium. The computer program is operable to control a gaming machine to perform the following steps: generating a first plurality of non-bingo game outcomes corresponding to a first payout level of a bingo game; generating a second plurality of non-bingo game outcomes corresponding to a second payout level of a bingo game; saving the first plurality of non-bingo game outcomes in a first area of a local memory; and saving the second plurality of non-bingo game outcomes in a second area of the local memory. The saving steps involve replacing non-bingo game outcomes previously stored in the local memory.

Alternative implementations of the invention provide a computer program stored in a machine-readable medium. The computer program is operable to control a gaming machine to perform the following steps: creating a queue of memory addresses for each payout amount of a bingo game; creating a plurality of non-bingo game outcomes; sorting the plurality of non-bingo game outcomes according to payout amounts of the bingo game; adding non-bingo game outcomes to the proper queues according to payout amount; determining when the queues contain sufficient non-bingo game outcomes to enable game play; and enabling game play when the queues contain sufficient non-bingo game outcomes.

Still other implementations of the invention provide another computer program stored in a machine-readable medium. The computer program is operable to control a gaming machine to perform the following steps: creating a queue of memory addresses for each payout amount of a bingo game; initializing start and end pointers to the first and last entries in each queue; creating a plurality of non-bingo game outcomes; sorting the plurality of non-bingo game outcomes according to payout amounts of the bingo game; adding non-bingo game outcomes to the proper queues according to payout amount; determining when the queues contain sufficient non-bingo game outcomes to enable game play; enabling bingo game play when the queues contain sufficient non-bingo game outcomes; selecting non-bingo game outcomes corresponding to bingo payout amounts by reference to the start pointers; incrementing the start pointers from selected non-bingo game outcomes; and replacing selected non-bingo game outcomes with created non-bingo game outcomes.

Yet other implementations of the invention provide a computer program stored in a machine-readable medium. The computer program is operable to control a gaming machine to perform the following steps: creating a queue of memory addresses for each payout amount of a first wagering game; initializing start and end pointers to the first and last entries in each queue; creating a plurality of second wagering game outcomes for a second wagering game different from the first wagering game; sorting the plurality of second wagering game outcomes according to payout amounts of the first wagering game; adding second wagering game outcomes to the proper queues according to payout amount; determining when the queues contain sufficient second wagering game outcomes to enable game play; enabling first wagering game play when the queues contain sufficient second wagering game outcomes; selecting second game outcomes corresponding to first wagering game payout amounts by reference to the start pointers; incrementing the start pointers from selected second wagering game outcomes; and replacing selected second wagering game outcomes with created second wagering game outcomes.

Some embodiments of the invention provide a gaming machine, including: a first logic device for generating a first plurality of non-bingo game outcomes corresponding to a first payout level of a bingo game and for generating a second plurality of non-bingo game outcomes corresponding to a second payout level of a bingo game; a local memory; and a second logic device for saving the first plurality of non-bingo game outcomes in a first area of the local memory and for saving the second plurality of non-bingo game outcomes in a second area of the local memory, wherein the second logic device replaces non-bingo game outcomes previously stored in the local memory.

Alternative embodiments of the invention provide another gaming machine including: a memory having a queue of memory addresses for each payout amount of a bingo game; a first logic device for creating a plurality of non-bingo game outcomes; a second logic device for sorting the plurality of non-bingo game outcomes according to payout amounts of the bingo game and for adding each of the plurality of non-bingo game outcomes to a corresponding queue according to payout amount; a third logic device for determining when the queues contain sufficient non-bingo game outcomes to enable game play. The gaming machine is configured to enable bingo game play when the queues contain sufficient non-bingo game outcomes.

The invention may be implemented by networked gaming machines, game servers and/or other such devices. These and other features and advantages of the invention will be described in more detail below with reference to the associated drawings.

DESCRIPTION OF THE PREFERRED EMBODIMENTS

Figure 1:
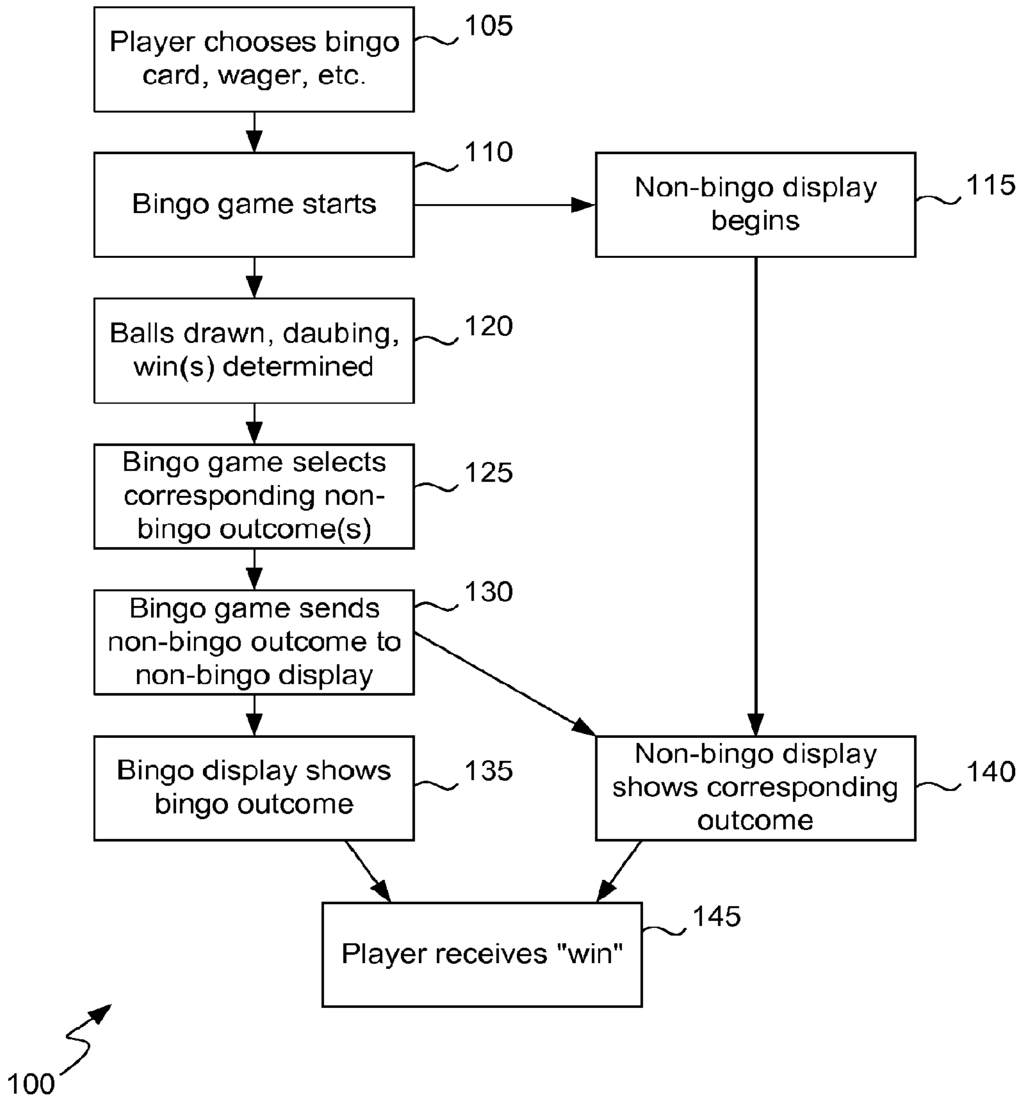
FIG. 1 is a flow chart illustrating one method for providing and displaying game outcomes according to the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides methods and devices for providing, preferably on a network of gaming machines, a first wagering game and a changing pool of outcomes for a corresponding second wagering game. The gaming machines may or may not have an initial pool of game outcomes for the second wagering game. Some implementations provide a bingo game having a changing pool of game outcomes for a corresponding non-bingo game, such as a card game or a slot game. Preferably, the "game outcomes" for the corresponding non-bingo game merely create displays for entertainment purposes, such that the overall game still satisfies the regulatory requirements for a Class II game. U.S. patent application Ser. No. 10/887,111, entitled "Multi-Player Bingo Game With Multi-Level Award Amount Pattern Mapping" and filed on or about Jul. 8, 2004, and Ser. No. 10/937,227, entitled "Bingo Game Morphed To Display Non-Bingo Outcomes" and filed Sep. 8, 2004 (collectively, the "Bingo Game Applications"), describe relevant devices and methods and are hereby incorporated by reference for all purposes.

In some preferred implementations, non-bingo game outcomes are generated by individual gaming machines on an ongoing basis and stored in local memory. Each of the non-bingo game outcomes corresponds with a bingo game outcome and/or payout amount. Preferably, the game outcomes are sorted and stored in local memory according to payout amounts for various bingo outcomes. It is preferable, but not essential, for each category of non-bingo game outcome to be stored in a queue of contiguous memory space. As used herein, a "queue" is a data structure in which elements are removed in the same order they were entered. A queue is generally implemented in a contiguous portion of memory, with a beginning pointer and an ending pointer. This is often referred to as FIFO (first in, first out). However, it will be appreciated by those of skill in the art that other types of data structures (e.g., of non-contiguous memory space) may be used to implement some methods of the invention.

After the memory space allocated for each category of non-bingo game outcomes is full, generated non-bingo game outcomes are preferably used to replace previously stored non-bingo game outcomes. In some preferred embodiments, only those non-bingo game outcomes that have already been selected and used to display a non-bingo outcome are replaced by generated non-bingo game outcomes.

The generation process may be continuous or intermittent. For example, the generation process may (or may not) be responsive to how many non-bingo game outcomes have been selected and used to display a non-bingo outcome during the course of providing a bingo game. The generation process may, for example, pause when a predetermined number of non-bingo game outcomes have been generated, stored and are ready for use. The generation process may resume when fewer than the predetermined number of non-bingo game outcomes are available for use. The predetermined number may be an aggregate number corresponding to non-bingo game outcomes for a plurality of payout levels. Alternatively, the generation process may continue (e.g., at a predetermined rate) without regard for the actual rate of consumption of the non-bingo game outcomes. In some implementations, a separate logic device is responsible for generating new non-bingo game outcomes.

In some "steady state" or "synchronous" implementations, non-bingo game outcomes are generated at a rate that approximates or matches a rate of game outcome usage. In other implementations, the rate of non-bingo game outcome generation does not depend on actual non-bingo game outcome usage. In some such implementations, the rate of non-bingo game outcome generation is predetermined and is high enough to match or exceed an expected rate of non-bingo game outcome usage.

In some implementations, the non-bingo game outcomes are stored as RNG seeds, each of which will provide a known outcome when processed by a pre-programmed "deterministic RNG." The deterministic RNG may be implemented, for example, by a logic device of the gaming machine. The RNG seeds are advantageous for security purposes. Moreover, they are easy to implement because most existing gaming machines use an RNG. Replacing this with a deterministic RNG allows central determination games to be implemented with minimal changes to existing Class III machines. U.S.

Pat. No. 6,533,664, entitled "Gaming System with Individualized Centrally Generated Random Number Generator Seeds," describes the use of RNG seeds and is hereby incorporated by reference for all purposes.

However, in other implementations, non-bingo game outcomes are stored in a variety of other forms. For example, the non-bingo game outcomes can be represented and stored according to the methods described in U.S. application Ser. No. 10/006,496, "Method for Representing a Game as a Unique Number," which is hereby incorporated by reference for all purposes. Alternatively, non-bingo game outcomes can be stored by reference to non-bingo symbols or to the display of such symbols. For example, if the non-bingo game is a slot game, non-bingo game outcomes can be stored by reference to reel stops, symbols in a pay line, etc.

FIG. 1 is a flow chart that outlines the use of non-bingo game outcomes within the context of a bingo game that includes a slot game display. The steps of method 100 may be performed by a properly configured gaming machine, acting in part under the control of data and/or commands from a network device such as a game server. In some implementations, a game server performs some or all of the steps of method 100. Those of skill in the art will appreciate that the steps of method 100 need not be performed (and in some implementations are not performed) in the order shown.

Moreover, some implementations of method 100 may include more or fewer steps than those shown in FIG. 1. The foregoing comments regarding method 100 apply to all methods illustrated and described herein.

Method 100 begins with step 105, wherein the player takes the initial steps to begin play of the game. For example, the player may place a bet, choose a bingo card, etc. The Bingo Game Applications describe relevant options that may be presented to the player during this step and other steps of the bingo game.

In step 110, the bingo game starts. Preferably, at or near the same time that the bingo game starts, the non-bingo display begins in step 115. For example, if the non-bingo display is a slot game display, the slot reels (or a depiction of slot reels) may start spinning. If the non-bingo display is a card game, cards could be shuffled, partially dealt, etc. If the non-bingo display is a roulette game, a depicted roulette wheel could appear to start spinning.

In step 120, the bingo game is conducted and at least one winner is determined. As noted in the Bingo Game Applications and elsewhere, some bingo games involve interim wins in addition to an overall win. Therefore, there could be more than one winner established in step 120. Moreover, winners at various payout levels could be established in step 120. In this example, a single 20-credit win, a 10-credit win and two 5-credit wins are established in step 120. All other wins are "0-credit wins," also referred to herein as "losing outcomes" or simply "losers." In this example, 396 losing outcomes are determined in step 120.

In step 125, the bingo game selects non-bingo outcomes that correspond with each of the wins established in step 120. As noted elsewhere herein, the non-bingo game outcomes are preferably sorted and stored in a local memory of each gaming machine according to possible payout amounts. In this example, each gaming machine selects an appropriate non-bingo game outcome, according to the payout amount that is due to the player of that gaming machine. Here, the non-bingo game outcomes are stored in the form of RNG seeds, so step 125 involves selecting an RNG seed that will produce the appropriate payout amount.

In step 130, the selected non-bingo game outcome is sent to a logic device that will produce the corresponding non-bingo outcome on an associated display. Here, because the selected non-bingo game outcome is an RNG seed, the logic device seeds its deterministic RNG program with that value, then uses the RNG to determine the game outcome. Since it is deterministic, it is known that an RNG seed that is supposed to produce, e.g., a 5-credit win will always produce a 5-credit win. Therefore, when the bingo display displays its win amount in step 135, the non-bingo display also indicates a corresponding outcome in step 140.

In this example, the non-bingo display is a slot display. Accordingly, in step 140, the logic device that controls the display of the non-bingo outcome stops the reels on whatever values were indicated by the RNG. In step 145, the game evaluates the win, displays the win amount and awards the win amount to the player.

There is no requirement for the slot display to evaluate its outcome. However, if the gaming machine used to perform methods of the invention is a gaming machine that was previously configured as a Class III slot machine, including this step makes the reconfiguring process easier. Such gaming machines already include a RNG capability. If the machine is configured to produce and retrieve the lists of RNG seeds according to the present invention, one can add bingo hardware to the machine and reconfigure the slot game to delay until it has received its RNG seed. After making those changes, the former Class III slot machine is configured for playing a Class II bingo game with a slot display to provide greater excitement to players.

The present invention encompasses a wide variety of methods for providing non-bingo outcomes for display. The simplest method is to provide hard-coded non-bingo outcomes in a memory, e.g., a memory provided with (or for) a gaming machine. Unless these outcomes are refreshed/replaced, only a fixed pool of non-bingo outcomes is available for creating the non-bingo displays. However, if the pool is large and/or is accessed randomly, some degree of player excitement can be maintained.

However, it is preferable to generate new non-bingo outcomes to replace those that have been used. One challenge comes in populating the memory or memories with non-bingo outcomes. In some implementations, non-bingo outcomes are formed into data structures such as tables. The method used to populate the memory can also help determine the method that we use to access the non-bingo outcomes. Although much of the following discussion involves the use of RNG seeds to store non-bingo outcomes, as noted elsewhere herein non-bingo outcomes may be stored in many other forms.

In some implementations, 32-bit RNG seeds are used to represent non-bingo outcomes. If a 16 MB memory were filled with 32-bit RNG seeds, each representing one non-bingo outcome, there would be a total of 4.2 billion possible outcomes. However, the available memory in a gaming machine that is dedicated to gaming software needs to be used to store other data, such as graphics, sounds, etc., to make the game interesting and exciting for the players. Therefore, in some implementations there may be less than 16 MB of memory available for RNG seeds.

Figure 2:
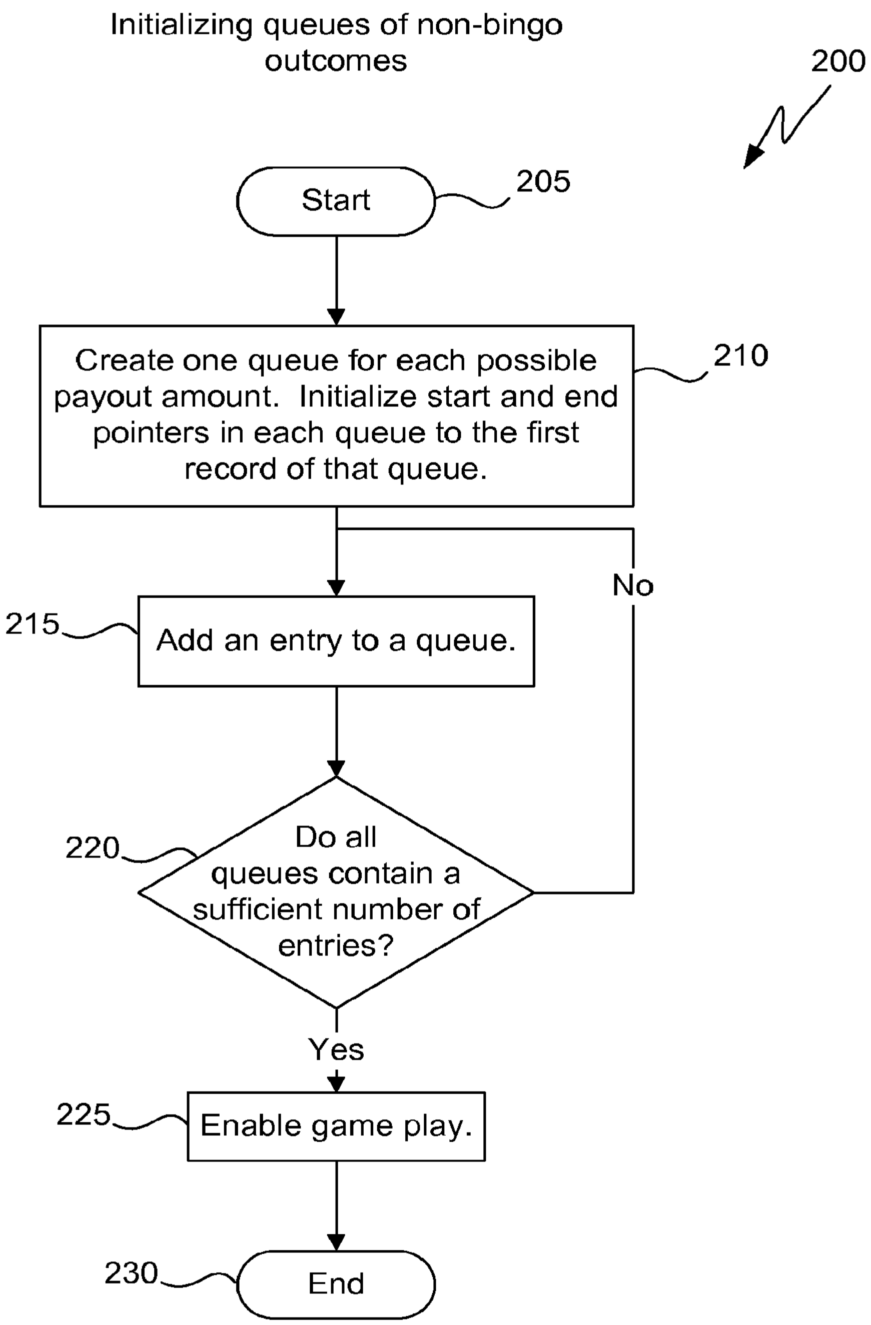
FIG. 2 is a flow chart illustrating one method for initializing queues of game outcomes according to the present invention.

FIG. 2 is a flow chart that outlines one exemplary method 200 for storing non-bingo outcomes in local memory prior to game play. This method could be used in a variety of contexts. For example, method 200 could be performed by a computing device operated by a gaming machine manufacturer, service provider or dealer before a gaming machine is installed at a customer location. Alternatively, method 200 could be performed by one or more logic devices of a gaming machine after delivery and installation, e.g., if the gaming machine had no non-bingo outcomes previously stored in local memory.

In method 200, the non-bingo outcomes are organized into queues. Accordingly, after the process starts (step 205), a queue is created for each possible payout amount for a first wagering game, which is a bingo game in this example. (Step 210.) In each queue, pointers are preferably initialized at this stage in the process. For example, start and end pointers may be initialized in each queue for the first non-bingo outcome to be stored in that queue. Other pointers may be initialized, either at this stage or a later stage. For example, a pointer may be initialized to indicate the end of the last non-bingo outcome stored in that queue.

In step 215, a non-bingo game outcome is generated, categorized and added to the appropriate queue. In some implementations, an RNG seed is generated and preprocessed by a software tool that determines, given this RNG seed, what the corresponding payout will be. Then, the RNG seed is classified accordingly and filed in the appropriate queue. For example, the tool could organize RNG seeds into various categories such as "zero payout RNG seeds," "5-credit payout RNG seeds," etc.

The majority of game outcomes are going to be "losers." For example, for a 90% payout gaming machine, there need to be 9 "zero payout" outcomes for each "9 credit payout" outcome. Because the majority of outcomes are "losers," the loser category needs more variety than any other outcome in order to provide an exciting gaming experience for players that is similar to that produced by a Class III game. Therefore, that part of memory dedicated to storing losers needs to be larger and/or refreshed more frequently than other parts of memory dedicated to other payout levels.

In step 220, it is determined (e.g., by a logic device of the gaming machine) whether there are enough non-bingo outcomes for satisfactory game play. In this example, it is determined in step 220 whether all queues contain a sufficient (predetermined) number of non-bingo outcomes. In other implementations, game play will be enabled when some queues (e.g., the most frequently accessed queues) have a satisfactory number of non-bingo outcomes, even though other queues (e.g., the less frequently accessed and higher payout queues) do not. If it is determined in step 220 that all queues contain a sufficient number of non-bingo outcomes, game play is enabled in step 225. If not, the process of generating, categorizing and storing non-bingo outcomes continues.

Figure 3:
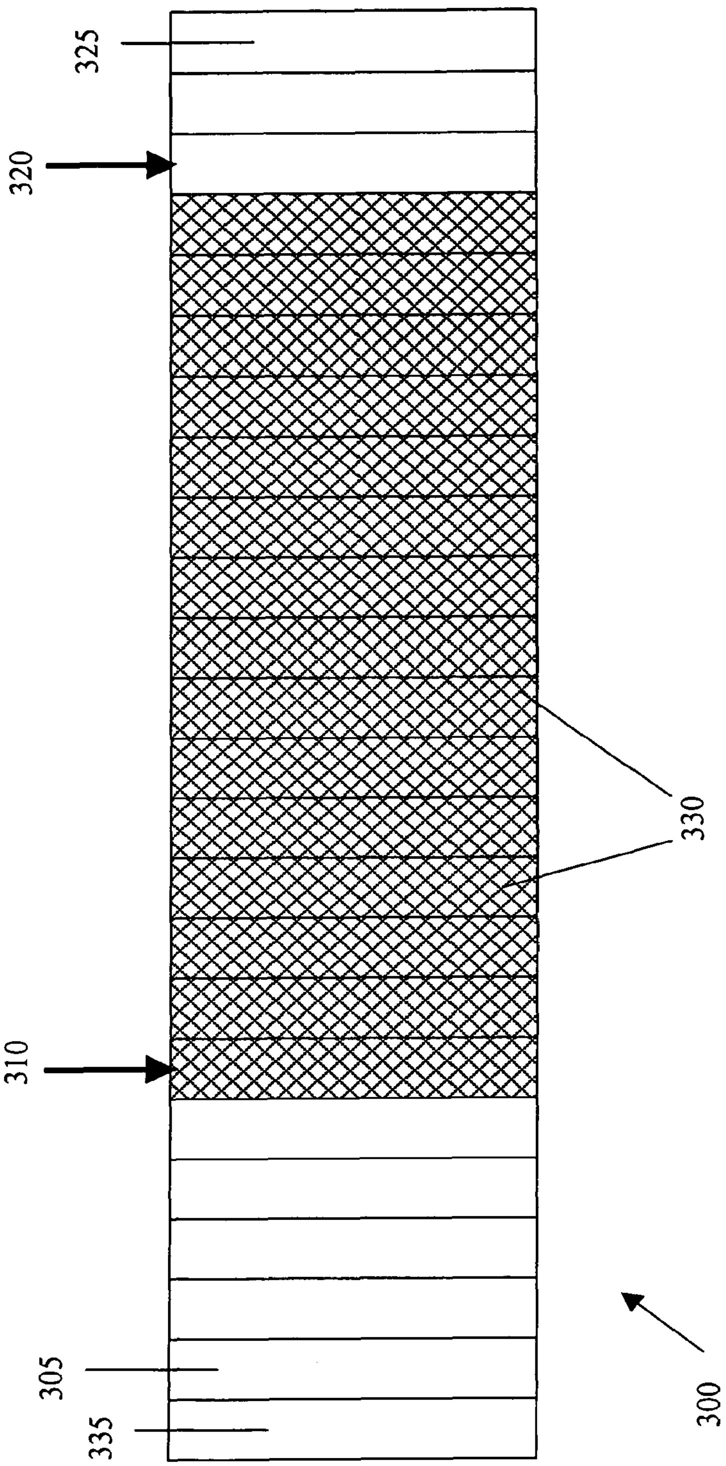
FIG. 3 is a schematic diagram of a memory for storing game outcomes according to some implementations of the present invention.

FIG. 3 is a schematic diagram that indicates memory queue 300 according to some implementations of the invention. In general, actual memory queues will have many more entries than are depicted in FIG. 3. Each entry of queue 300 will produce a second wagering game outcome corresponding to the same payout amount, which could be any amount applicable to payouts of a first wagering game. In this implementation, the first wagering game is a bingo game and each memory address 305 can contain a single non-bingo outcome.

Here, non-bingo outcomes are selected from queue 300 in a sequential, FIFO fashion. Pointer 310 indicates the next memory address that will be accessed to select the next non-bingo outcome to be displayed for a corresponding bingo outcome. Non-bingo outcomes 330 (shown in a cross-hatched pattern) have previously been generated, sorted and stored in queue 300, e.g., according to one of the methods described herein. Accordingly, non-bingo outcomes 330 are ready to be selected and used to provide an entertaining display. Pointer 320 indicates the location of the memory address for the next non-bingo outcome to be stored in queue 300, after it is generated, sorted and determined to correspond with the same payout amount as the other non-bingo outcomes of queue 300.

Those of skill in the art will appreciate the fact that after a new non-bingo outcome has been added to memory address 325, pointer 320 will return to memory address 335. Similarly, after the non-bingo outcome in memory address 325 has been consumed, pointer 310 will return to memory address 335 to obtain the next non-bingo outcome for use.

In this implementation, only non-bingo outcomes that have not previously been used are made available for selection. According to some implementations of the invention, if the number of new non-bingo outcomes 330 available for use drops below a predetermined threshold level, a process of generating new non-bingo outcomes will be resumed. Therefore, in such implementations, the rate of generating new non-bingo outcomes is responsive to actual usage/consumption of non-bingo outcomes. In some such implementations, the rate of generating new non-bingo outcomes depends upon the rate at which non-bingo outcomes are used/consumed.

In alternative implementations, the process of generating new non-bingo outcomes is not is responsive to actual usage/consumption of non-bingo outcomes. In some such alternative implementations, the rate of generating new non-bingo outcomes should be set at a rate that is high enough such that new, unused non-bingo outcomes will always be available for selection during game play. In such implementations, unused non-bingo outcomes will sometimes be replaced with newly-generated non-bingo outcomes.

In yet other implementations, newly-generated non-bingo outcomes are randomly placed into memory. In some such implementations, non-bingo outcomes are selected for use in a random fashion and in other such implementations non-bingo outcomes are selected for use in according to a predetermined pattern. However, it may be more satisfactory to make sure that each non-bingo outcome selected for use has not previously been used. Orderly processes of selecting and populating memories with new non-bingo outcomes will generally produce displayed non-bingo outcomes that seem more random. Otherwise, the game may, for example, randomly generate non-bingo outcomes that are never used and randomly select non-bingo outcomes that have already (and perhaps recently) been used.

Figure 4:
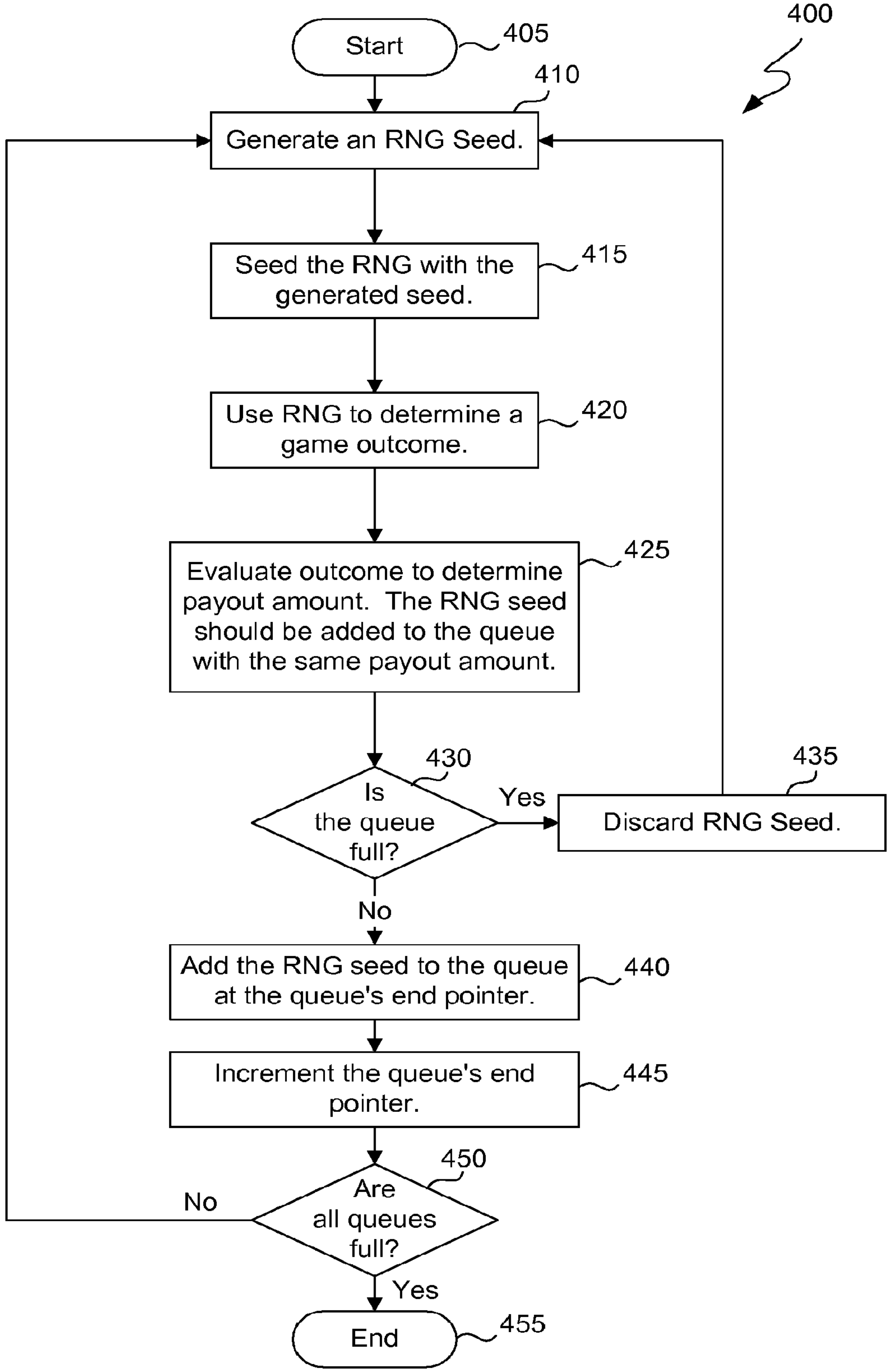
FIG. 4 is a flow chart illustrating one method for adding a game outcome to a queue of game outcomes according to the present invention.

FIG. 4 is a flow chart that outlines method 400 according to some aspects of the invention. Method 400 involves generating, sorting and storing non-bingo outcomes in the form of RNG seeds. As noted elsewhere, non-bingo outcomes may be generated, sorted and stored in various other forms.

Like method 200, method 400 may be used in many different contexts. For example, method 400 may be used to continue the process of filling and/or replenishing queues after they are established, e.g., as described above. Method 400 may also be used if some non-bingo outcomes were stored in local memory (e.g., the local memory was pre-supplied with some non-bingo outcomes), but if the number of stored non-bingo outcomes were deemed to be insufficient. Accordingly, there may be various "triggers" that will invoke method 400 and cause it to start. (Step 405.)

After method 400 begins, an RNG seed is generated in step 410. The RNG seed is used to seed a deterministic RNG program (step 415) that determines a corresponding non-bingo game outcome (step 420). The non-bingo game outcome is then evaluated to determine a corresponding payout amount (step 425). If the RNG seed is stored, it should be stored in a memory space that has been allocated for non-bingo game outcomes for the same payout amount.

In step 430, it is determined whether the memory space for storing non-bingo outcomes corresponding to the determined payout amount is full. In this implementation, new non-bingo outcomes are not added to the corresponding memory space (e.g., a queue) if the memory space is full. Accordingly, if the queue is full, the RNG seed is discarded. (Step 435.) In alternative implementations, the new RNG seed is stored in memory, replacing an existing RNG seed whether it has been used or not.

If the queue is not full, the RNG seed is added to the queue in an appropriate location. Here, the RNG seed is added at the queue's end pointer (step 440) and then the end pointer is "incremented," i.e., moved to the next memory address where an RNG seed will be stored. If all queues are full, the process ends (step 455). If not, another RNG seed is generated. (Step 410.)

The frequency with which the winners and losers are added or refreshed should roughly correspond to the expected frequency of payouts at the various levels. For example, if a bingo game produces a 10-credit outcome every 100 games, we would expect that roughly 1 out of every 100 RNG seeds would produce a 10-credit payout. If about 1% of our list of non-bingo outcomes is dedicated to 10-credit payouts, about 1% of the RNG seeds will be added to that 10-credit list. As a result, we would expect the results to be used/consumed at about the same frequency with which they are drawn.

Figure 5:
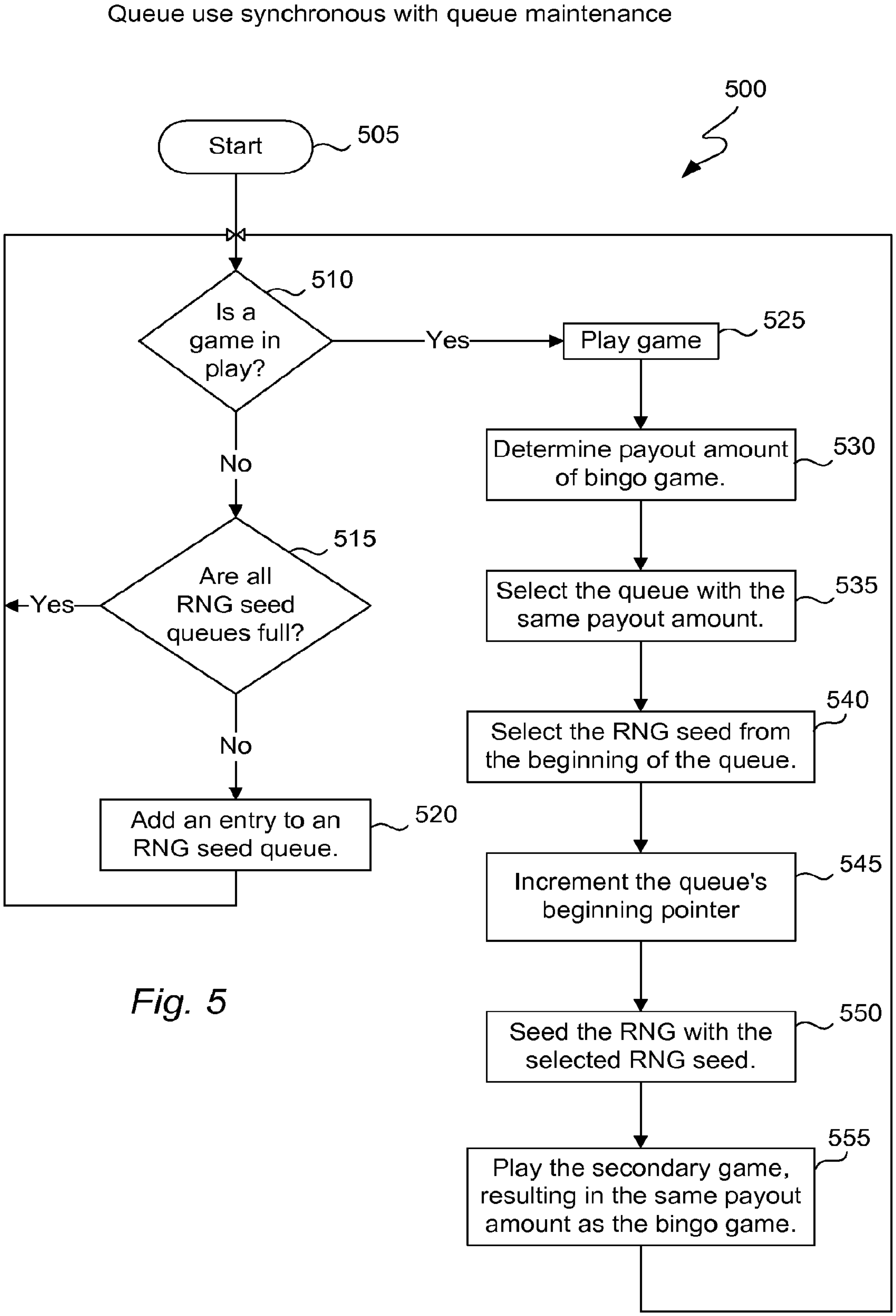
FIG. 5 is a flow chart illustrating one method for using and replenishing game outcomes according to the present invention.

FIG. 5 outlines method 500, which is one exemplary method wherein the use of non-bingo game outcomes provides input for determining whether new non-bingo outcomes will be generated by a gaming machine. According to method 500, non-bingo outcomes are generated and stored in memory if (1) there is no game currently in play on the gaming machine and (2) all memory addresses designated for storing non-bingo outcomes are not full.

In alternative implementations, such as method 660 (described below with reference to FIG. 6), non-bingo outcomes are generated and stored in memory regardless of whether all memory addresses designated for storing non-bingo outcomes are full. In still other implementations, non-bingo outcomes can be generated even when a game is in play. In some such implementations, one or more logic devices are dedicated to generating non-bingo outcomes, evaluating them and causing them to be stored in memory. Methods 500 and 600 will be described in terms of RNG seeds and memory queues although, as noted elsewhere herein, non-bingo outcomes may be manifested in other forms and stored in other types of data structures.

After method 500 has started (step 505), it is determined in step 510 whether there is a game in play. Such a determining step is particularly useful for implementations in which game outcomes are not generated when a game is in play. For example, in some exemplary embodiments there is game logic that requests and receives numbers from an RNG, then uses the numbers to determine an outcome. Such logic is sometimes referred to as a "game engine." In some such embodiments, there is separate logic (sometimes referred to as the "evaluator") for evaluating the outcome to determine the payout amount. In such embodiments, the game engine and the evaluator can be accessed independently of game play, so that the same logic modules used to play a live game and evaluate outcomes are also used to fill the queue with outcomes. These embodiments have the distinct advantage of eliminating synchronization issues, such as making sure that the logic module that produces and stores outcomes in the queue is interpreting the numbers in the same way as the logic module that determines and evaluates the outcomes. There is no synchronization issue because the same module is used for both tasks.

However, such modules may not be "reentrant." If not, the logic module must be accessed once and allowed to complete its task before being accessed again. If a non-reentrant module accessed again before its current task is complete, the results are unpredictable. This means that if the game play module and the queue-filling module are not reentrant, they cannot both access the game engine or the evaluator at the same time. Thus, it becomes necessary for the queue-filling module to check first to see if a game is in progress, before proceeding to generate and evaluate RNG seeds.

If no game is in play, it is determined (step 515) whether all RNG seed queues are full. If all RNG seed queues are not full, RNG seeds are generated, sorted and used to populate the queue or queues that are not full. If all RNG seed queues are full, the process returns to step 510.

If a bingo game is in play, the bingo game is played (step 525) and a payout amount is determined for the bingo game (step 530). The RNG seed queue with the same payout amount is selected (step 535) and an RNG seed is selected from the queue, e.g., from a pointer within the queue indicating the beginning of the queue of available RNG seeds. (Step 540.) The pointer is then incremented (step 545) and the RNG software is seeded with the selected RNG seed (step 550), causing a non-bingo or "secondary" game display to be presented to the player.

Preferably, the payout amount indicated by the non-bingo display is the same as the payout amount for the bingo game: in general, the probabilities of the bingo game are matched with the probabilities of the non-bingo game. This is not absolutely required, however. For example, one could have a slot game that looks like a "great payer" but the bingo game that actually drives the outcome is a lower payout game. If so, a player will get fewer than the expected number of payouts on the slot game. For example, if the slot game has a 90% pay table and the bingo game happens to be an 80% bingo game, the game has a more attractive look and presents more exciting outcomes. The players are not getting more money, but this configuration is more exciting for some players.

Figure 6:
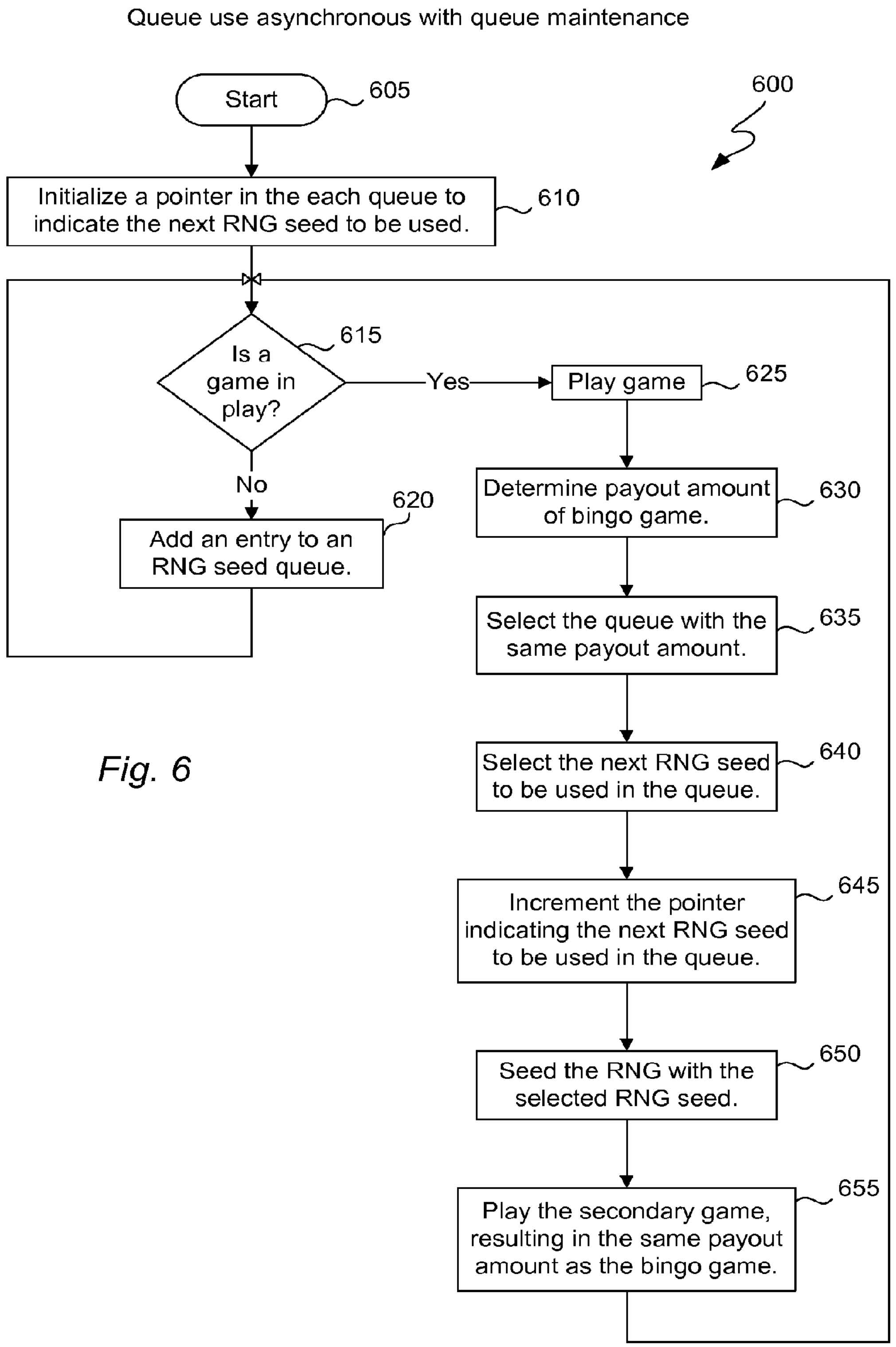
FIG. 6 is a flow chart illustrating an alternative method for using and replenishing game outcomes according to the present invention.

FIG. 6 is a flow chart that depicts method 600 according to some implementations of the invention. After method 600 starts (step 605), a pointer in each queue is initialized to indicate the next RNG seed to be used. If a bingo game is not in play, RNG seeds are generated, sorted and added to the appropriate queue whether or not the queues are already full. (Step 620.) Consequently, some RNG seeds will be overwritten before they are selected and used.

If a bingo game is in play, the bingo game is played (step 625) and a payout amount is determined for the bingo game (step 630). The RNG seed queue with the same payout amount is selected (step 635) and an RNG seed is selected from the queue, e.g., from a pointer within the queue indicating the beginning of the queue of available RNG seeds. (Step 640.) The pointer is incremented (step 645) to indicate the next RNG seed in the queue that is to be used. The RNG software is seeded with the selected RNG seed (step 650), causing a non-bingo or "secondary" game display to be presented to the player. (Step 655.)

As noted above, other embodiments populate memory addresses with non-bingo outcomes, but not in the form of RNG seeds. The non-bingo outcomes could be, for example, in the form of a number that produces a deterministic outcome, as described in U.S. patent application Ser. No. 10/006,496, entitled "Method for Representing a Game as a Unique Number," which is hereby incorporated by reference and for all purposes. Some methods described therein convert a range of possible game outcomes into a contiguous and unique range of integers, e.g., from 0 to P-1, where P represents the number of possible game outcomes.

One advantage of using this method (as compared to using RNG seeds) is that when using RNG seeds it is guaranteed that some will produce duplicate outcomes. For example, there are about 2.5 million possible poker hands. When using 32-bit RNG seeds, there are 4.2 billion possible RNG seeds. When using these seeds to represent poker hands, every poker hand will occur almost 2,000 times in the range of RNG seeds. If you could reduce this to a number in the range of, e.g., 0 to 2.5 million, you could reduce the size of the number to 24 bits (3 bytes instead of 4) and use 25% less storage space. Alternatively, one could use the same amount of memory and have 33% more memory space for other game software, graphics, sounds, etc.

Yet other implementations provide alternatives to storing all non-bingo outcomes. For example, if a range of non-bingo outcomes is found that all produce the same payout, each of the non-bingo outcomes does not need to be individually stored. Instead, the start and end of the range of numbers could be stored. When a non-bingo outcome with that payout amount is needed, a random number could be called out of that range of numbers.

In other words, suppose that the gaming machine has calculated a number of RNG seeds and has determined corresponding game outcomes, given a particular game and/or pay table. The RNG seeds have been categorized according the outcomes. We will note that a range of these RNG seeds produces the same game outcome, e.g., of losers because there are so many losers. Supposed non-bingo outcomes 0 through 2043 are losers. Instead of a table, one could store, e.g., "outcome 0 through outcome 2043" as losers. One does not need to store 2044 entries, but only the range 0 to 2043.

Some implementations provide a table of records according to non-bingo game outcomes, wherein the table is dynamically augmented or refreshed. There could be one table for each outcome amount/win amount. How the entry is internally specified may vary according to the implementation. A single entry could be an RNG seed. A single entry could be a game-to-integer style number. In other implementations, an outcome may require multiple entries, e.g., 5 entries indicating 5 reels stops for a 5-reel slot game. For a one-payline game, it could be one entry indicating the symbols that occur along that line. The order of symbols along the payline may or may not be specified.

Some implementations of the invention provide methods for maintaining a queue of game outcome ranges, including but not limited to RNG seed ranges. In one such implementation, when an RNG seed is added to the queue, the queue is first inspected to see if there is an RNG seed or RNG seed range that covers an RNG seed value that is one less than or one more than the RNG seed. (A numeric sorting of all entries in the queue can greatly speed up this search, but it is not required.) If so, the RNG seed can be combined with the existing entry.

For example, if the RNG seed is 243, we could look for an RNG seed of 242 or 244, or RNG seed ranges ending with 242 or beginning with 244. If an RNG seed of 242 is found in the queue, we change it to a range entry of 242-243. If a range entry is found ending with 242, we change it to end with 243. If an RNG seed of 244 is found, we change it to a range entry of 243-244. If a range entry is found beginning with 244, we change it to begin with 243. Using this method, an RNG seed can be added to a queue without increasing the number of entries in the queue.

When an RNG seed needs to be used from a queue, the first entry is examined. If it is a single entry (e.g. 112), that entry is used and removed from the queue in the manner already described in the application. If the entry is a range entry (e.g. 212 to 243), the beginning value is used, then incremented, but the queue is not otherwise modified. That is, the RNG seed value of 212 will be used and the queue entry will be changed to specify a range of 213 to 243. It is also possible (though less desirable) to use and remove the ending value instead of the beginning Alternatively, a value from the middle of the range can be used, then the remainder of the range can be split into two new ranges.

Storing two nearly identical RNG seeds (e.g. 242 and 243) does not necessarily imply that the game outcomes they represent will resemble each other. Due to the mathematical operations performed by the RNG, two consecutive RNG seeds can, and usually do, produce very different results. The opposite is true for game outcomes formed according to the "Game to integer" invention described in U.S. patent application Ser. No. 10/006,496 and incorporated by reference herein. For such game outcomes, the closer two numbers are to one another, the more likely their game outcomes are to resemble one another.

Some games of the present invention can be implemented, in part, in a gaming device according to game data received from a game server. The gaming device may receive such game data through a dedicated gaming network and/or through a public data network such as the Internet.

Figure 7:
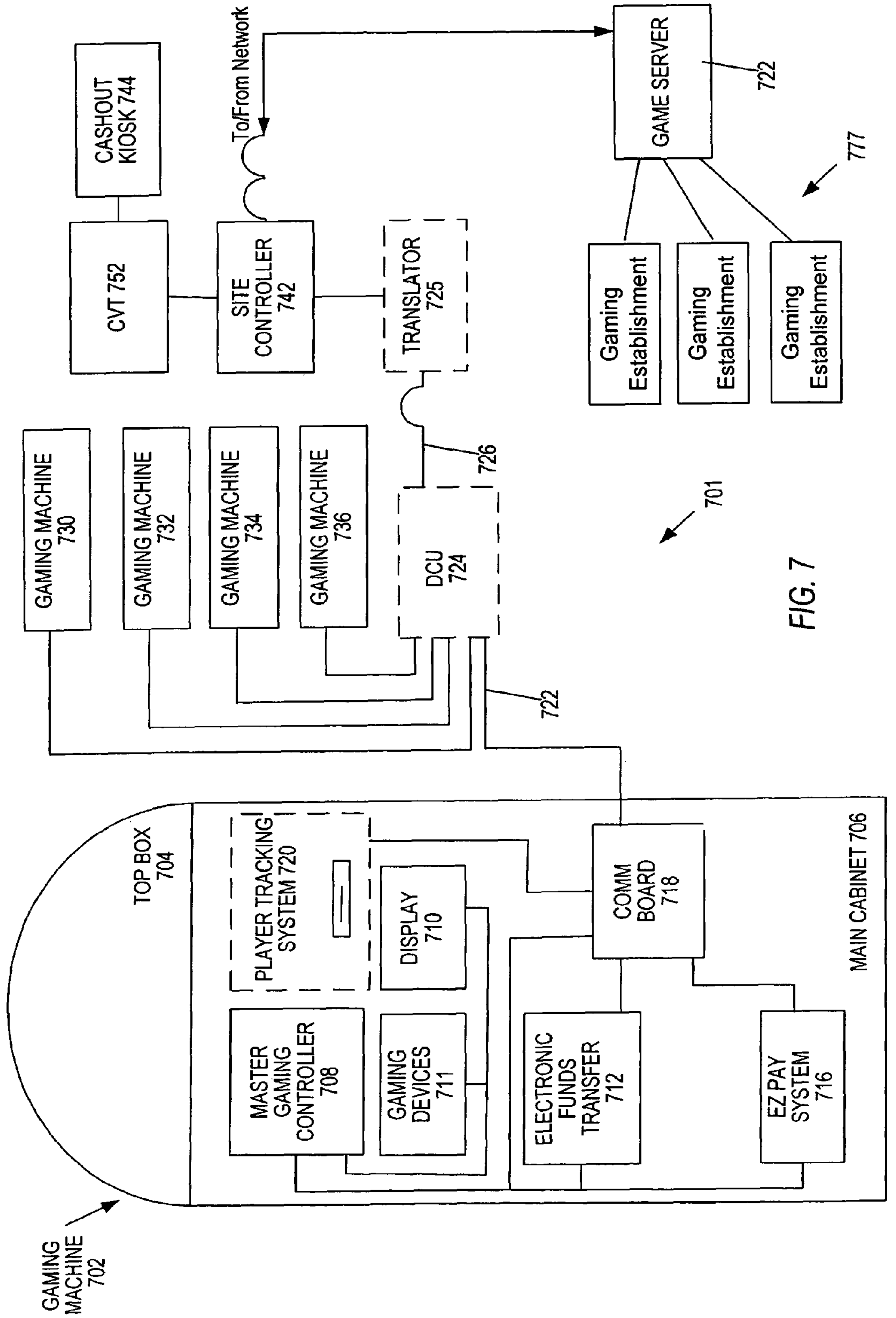
FIG. 7 is a block diagram of a number of gaming machines in a gaming network that may be configured to implement some methods of the present invention.

One example of a gaming machine network that may be used to implement methods of the invention is depicted in FIG. 7. Gaming establishment 701 could be any sort of gaming establishment, such as a casino, a card room, an airport, a store, etc. However, the methods and devices of the present invention are intended for gaming networks (which may be in multiple gaming establishments) in which there is a sufficient number of Class II gaming machines for bingo play. In this example, gaming network 777 includes more than one gaming establishment, all of which are networked to game server 722.

Here, gaming machine 702, and the other gaming machines 730, 732, 734, and 736, include a main cabinet 706 and a top box 704. The main cabinet 706 houses the main gaming elements and can also house peripheral systems, such as those that utilize dedicated gaming networks. The top box 704 may also be used to house these peripheral systems.

The master gaming controller 708 controls the game play on the gaming machine 702 according to instructions and/or game data from game server 722 and receives or sends data to various input/output devices 711 on the gaming machine 702. Details of exemplary systems for using a game server to control a network of gaming machines to implement bingo games are described in U.S. Patent Application No. 60/503,161 (client docket number P-888), filed Sep. 15, 2003 and entitled "Gaming Network with Multi-Player Bingo Game." This application has been incorporated by reference herein for all purposes. The master gaming controller 708 may also communicate with a display 710.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTS), cashless ticketing, such as EZPay™, marketing management, and data tracking, such as player tracking Therefore, master gaming controller 708 may also communicate with EFT system 712, EZPay™ system 716 (a proprietary cashless ticketing system of the present assignee), and player tracking system 720. The systems of the gaming machine 702 communicate the data onto the network 722 via a communication board 718.

It will be appreciated by those of skill in the art that the present invention could be implemented on a network with more or fewer elements than are depicted in FIG. 7. For example, player tracking system 720 is not a necessary feature of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment.

Moreover, DCU 724 and translator 725 are not required for all gaming establishments 701. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 742 provides this function for gaming establishment 701. Site controller 742 is connected to a central system and/or other gaming establishments via one or more networks, which may be public or private networks. Among other things, site controller 742 communicates with game server 722 to obtain game data, such as ball drop data, bingo card data, etc.

In the present illustration, gaming machines 702, 730, 732, 734 and 736 are connected to a dedicated gaming network 722. In general, the DCU 724 functions as an intermediary between the different gaming machines on the network 722 and the site controller 742. In general, the DCU 724 receives data transmitted from the gaming machines and sends the data to the site controller 742 over a transmission path 726. In some instances, when the hardware interface used by the gaming machine is not compatible with site controller 742, a translator 725 may be used to convert serial data from the DCU 724 to a format accepted by site controller 742. The translator may provide this conversion service to a plurality of DCUs.

Further, in some dedicated gaming networks, the DCU 724 can receive data transmitted from site controller 742 for communication to the gaming machines on the gaming network. The received data may be, for example, communicated synchronously to the gaming machines on the gaming network.

Here, CVT 752 provides cashless and cashout gaming services to the gaming machines in gaming establishment 701. Broadly speaking, CVT 752 authorizes and validates cashless gaming machine instruments (also referred to herein as "tickets" or "vouchers"), including but not limited to tickets for causing a gaming machine to display a game result and cashout tickets. Moreover, CVT 752 authorizes the exchange of a cashout ticket for cash. These processes will be described in detail below. In one example, when a player attempts to redeem a cashout ticket for cash at cashout kiosk 744, cash out kiosk 744 reads validation data from the cashout ticket and transmits the validation data to CVT 752 for validation. The tickets may be printed by gaming machines, by cashout kiosk 744, by a stand-alone printer, by CVT 752, etc. Some gaming establishments will not have a cashout kiosk 744. Instead, a cashout ticket could be redeemed for cash by a cashier (e.g. of a convenience store), by a gaming machine or by a specially configured CVT.

Figure 8:
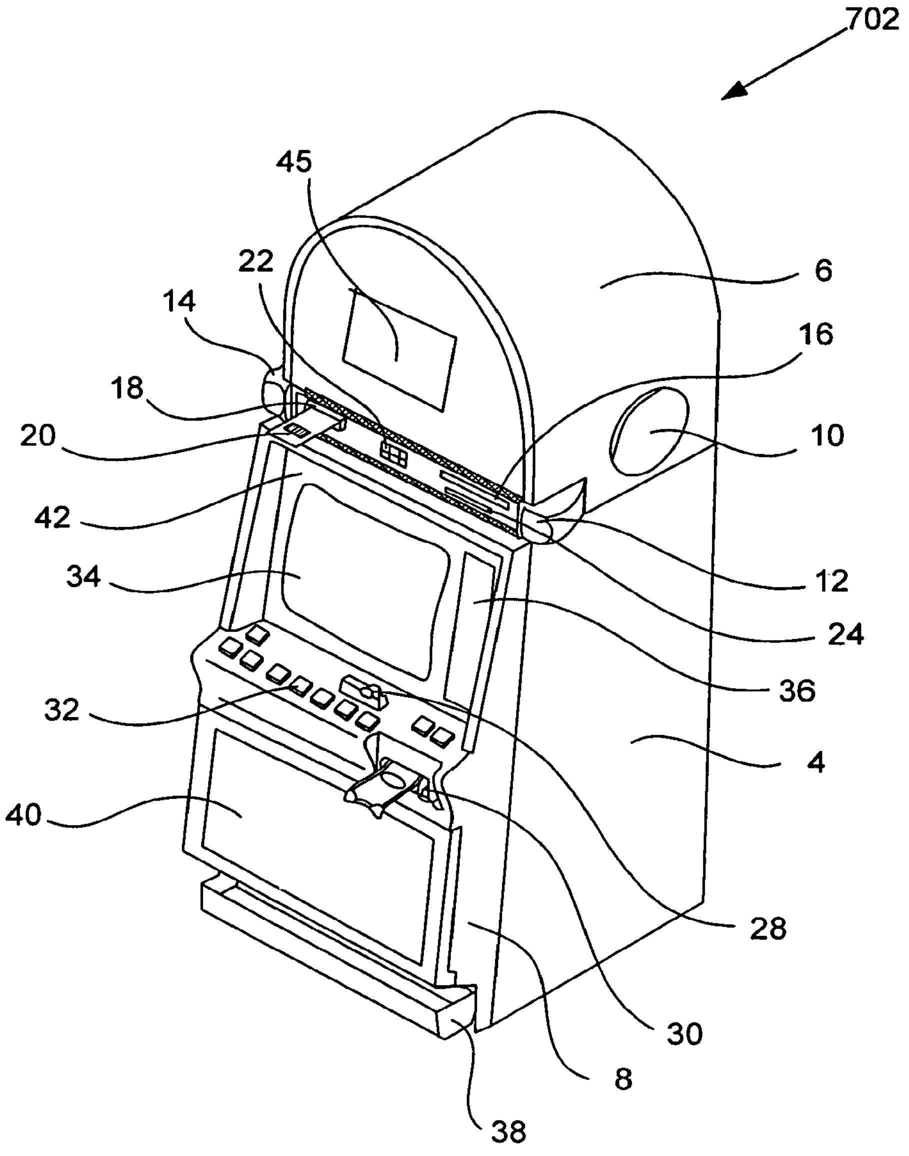
FIG. 8 illustrates an exemplary gaming machine that may be configured to implement some methods of the present invention.

Turning to FIG. 8, more details of gaming machine 702 are described. Machine 702 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 702. The devices are controlled by circuitry housed inside the main cabinet 4 of the machine 702.

The gaming machine 702 includes a top box 6, which sits on top of the main cabinet 4. The top box 6 houses a number of devices, which may be used to add features to a game being played on the gaming machine 702, including speakers 10, 12, 14, a ticket printer 18 which may print bar-coded tickets 20 used as cashless instruments. The player tracking unit mounted within the top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 702 is but one example from a wide range of gaming machine designs on which the present invention may be implemented. For example, not all suitable gaming machines have top boxes or player tracking features. Further, some gaming machines have two or more game displays—mechanical and/or video. Some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present can be deployed on most gaming machines now available or hereafter developed. Moreover, some aspects of the invention may be implemented on devices which lack some of the features of the gaming machines described herein, e.g., workstation, desktop computer, a portable computing device such as a personal digital assistant or similar handheld device, a cellular telephone, etc. U.S. patent application Ser. No. 09/967,326, filed Sep. 28, 2001 and entitled “Wireless Game Player,” is hereby incorporated by reference for all purposes.

Returning to the example of FIG. 8, when a user wishes to play the gaming machine 702, he or she inserts cash through the coin acceptor 28 or bill validator 30. In addition, the player may use a cashless instrument of some type to register credits on the gaming machine 702. For example, the bill validator 30 may accept a printed ticket voucher, including 20, as an indicium of credit. As another example, the card reader 24 may accept a debit card or a smart card containing cash or credit information that may be used to register credits on the gaming machine.

During the course of a game, a player may be required to make a number of decisions. For example, a player may vary his or her wager on a particular game, select a prize for a particular game, or make game decisions regarding gaming criteria that affect the outcome of a particular game (e.g., which cards to hold). The player may make these choices using the player-input switches 32, the video display screen 34 or using some other hardware and/or software that enables a player to input information into the gaming machine (e.g. a GUI displayed on display 16).

During certain game functions and events, the gaming machine 702 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 702, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 702. In some embodiments, these tickets may be used by a game player to obtain game services.

IGT gaming machines are implemented with special features and/or additional circuitry that differentiate them from general-purpose computers (e.g., desktop PC’s and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA RS232 serial interfaces provided by general-purpose computers. These interfaces may include EIA RS485, EIA RS422, Fiber Optic Serial, Optically Coupled Serial Interfaces, current loop style serial interfaces, etc. In addition, to conserve serial interfaces internally in the slot machine, serial devices may be connected in a shared, daisy-chain fashion where multiple peripheral devices are connected to a single serial channel.

IGT Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the trusted memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Gaming machines used for Class III games generally include software and/or hardware for generating random numbers. However, gaming machines used for Class II games may or may not have RNG capabilities. In some machines used for Class II games, RNG capability may be disabled.

Figure 9:
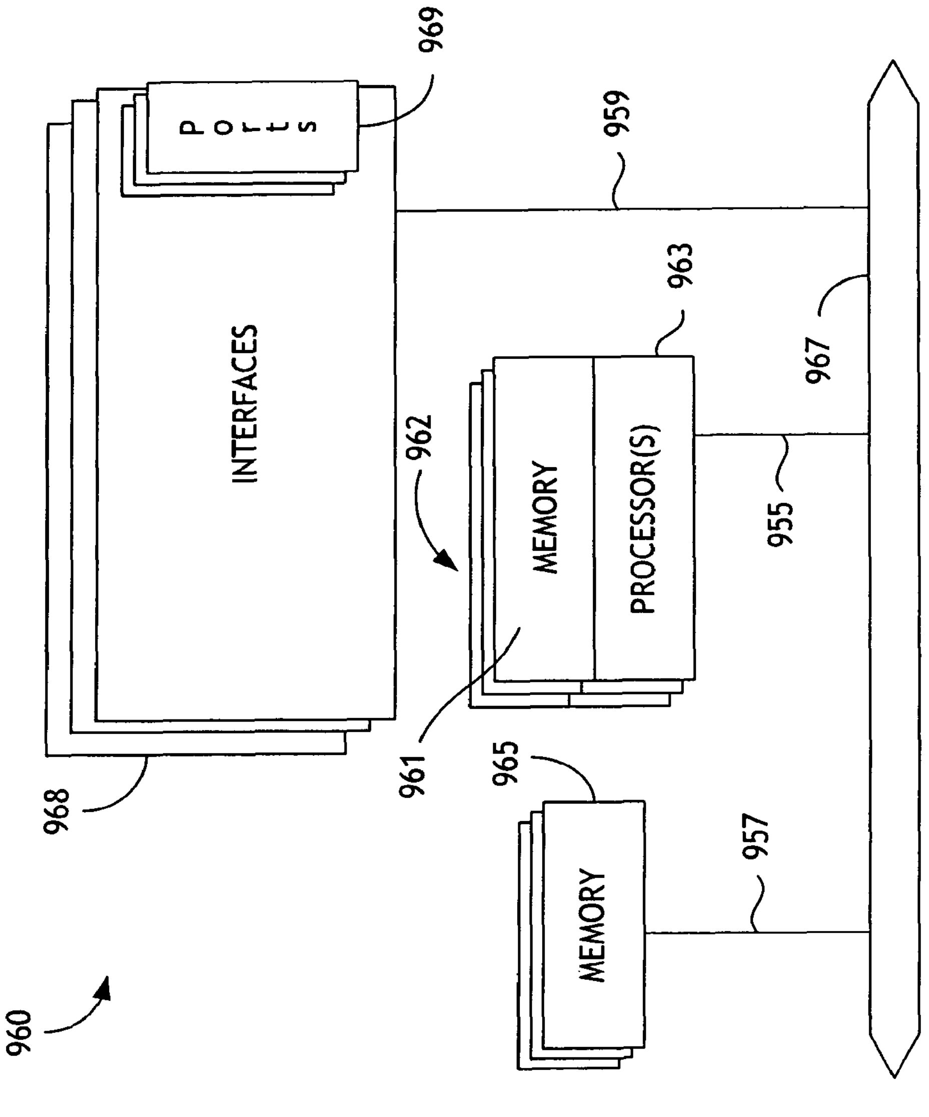
FIG. 9 is a block diagram of an exemplary network device that may be configured as a game server to implement some methods of the present invention.

FIG. 9 illustrates an example of a network device that may be configured as a game server for implementing some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "linecards"). Generally, interfaces 968 control the sending and receiving of data packets over the network and sometimes support other peripherals used with the network device 960. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 9) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although the foregoing invention has been described in some detail for purposes of clarity of understanding, it will be apparent that certain changes and modifications may be practiced within the scope of the appended claims.

We claim:

1. A method comprising:

causing at least one processor to execute a plurality of instructions stored in at least one memory device to generate a plurality of non-bingo game outcomes, each generated non-bingo game outcome associated with one of a plurality of different payout amounts;

causing the at least one processor to execute the plurality of instructions to form a plurality of queues in a memory, each queue associated with a different one of the plurality of payout amounts;

causing the at least one processor to execute the plurality of instructions to, for each generated non-bingo game outcome, assign said generated non-bingo game outcome to the queue associated with the payout amount with which said generated non-bingo game outcome is associated;

causing the at least one processor to execute the plurality of instructions to receive a request for a non-bingo game outcome, the request including information indicating a bingo payout amount corresponding to one of the plurality of payout amounts;

causing the at least one processor to execute the plurality of instructions to select one of the non-bingo game outcomes from the queue associated with the payout amount corresponding to said bingo payout amount;

causing the at least one processor to execute the plurality of instructions to provide the selected non-bingo game outcome;

causing the at least one processor to execute the plurality of instructions to remove the provided non-bingo game outcome from the queue to which the provided non-bingo game outcome is assigned;

causing the at least one processor to execute the plurality of instructions to generate a replacement non-bingo game outcome associated with the payout amount associated with the provided non-bingo game outcome; and causing the at least one processor to execute the plurality of instructions to assign the replacement non-bingo game outcome to the queue from which the provided non-bingo game outcome was removed.

2. The method of claim 1, wherein the generated non-bingo game outcomes are random number seeds.

3. The method of claim 2, further comprising:

causing the at least one processor to execute the plurality of instructions to provide the selected non-bingo game outcome to a random number generator; and causing the at least one processor to execute the plurality of instructions to process the selected non-bingo game outcome with the random number generator.

4. The method of claim 3, which includes:

causing the at least one processor to execute the plurality of instructions to cause at least one display device to display the selected non-bingo game outcome as a combination of game symbols determined by the random number generator in response to processing the selected non-bingo game outcome.

5. The method of claim 1, which includes causing the at least one processor to execute the plurality of instructions to provide the selected non-bingo game outcome after each queue in the plurality of queues includes a predetermined number of non-bingo game outcomes, wherein the predetermined number of non-bingo game outcomes may vary from queue to queue.

6. A computer program stored in a non-transitory machine-readable medium, the computer program configured to control a gaming device to:

generate a plurality of non-bingo game outcomes, each generated non-bingo game outcome associated with one of a plurality of different payout amounts;

form a plurality of queues in a memory, each queue associated with a different one of the plurality of payout amounts;

for each generated non-bingo game outcome, assign said generated non-bingo game outcome to the queue associated with the payout amount with which said generated non-bingo game outcome is associated;

receive a request for a non-bingo game outcome, the request including information indicating a bingo payout amount corresponding to one of the plurality of payout amounts;

provide the selected non-bingo game outcome;

remove the provided non-bingo game outcome from the queue to which the provided non-bingo game outcome is assigned;

generate a replacement non-bingo game outcome associated with the payout amount associated with the provided non-bingo game outcome; and assign the replacement non-bingo game outcome to the queue from which the provided non-bingo game outcome was removed.

7. The computer program stored in the non-transitory machine readable medium of claim 6, wherein the non-bingo game outcomes are random number seeds.

8. The computer program stored in the non-transitory machine-readable medium of claim 7, the computer program further configured to control the gaming device to:

provide the selected non-bingo game outcome to a random number generator; and process the selected non-bingo game outcome with the random number generator.

9. The computer program stored in the non-transitory machine-readable medium of claim 8, the computer program further configured to control the gaming device to:

display the selected non-bingo game outcome as a combination of game symbols determined by the random number generator in response to processing the selected non-bingo game outcome.

10. The computer program stored in the non-transitory machine-readable medium of claim 6, the computer program further configured to control the gaming device to provide the selected non-bingo game outcome only after each queue in the plurality of queues includes a predetermined number of non-bingo game outcomes, wherein the predetermined number of non-bingo game outcomes may vary from queue to queue.

11. A gaming system, the gaming system comprising:

one or more gaming machines; and a gaming device, wherein the gaming device is configured to:

generate a plurality of non-bingo game outcomes, each generated non-bingo game outcome associated with one of a plurality of different payout amounts;

form a plurality of queues in a memory, each queue associated with a different one of the plurality of payout amounts;

for each generated non-bingo game outcome, assign said generated non-bingo game outcome to the queue associated with the payout amount with which said generated non-bingo game outcome is associated;

receive a request for a non-bingo game outcome, the request including information indicating a bingo payout amount corresponding to one of the plurality of payout amounts;

provide the selected non-bingo game outcome;

remove the provided non-bingo game outcome from the queue to which the provided non-bingo game outcome is assigned;

generate a replacement non-bingo game outcome associated with the payout amount associated with the provided non-bingo game outcome; and assign the replacement non-bingo game outcome to the queue from which the provided non-bingo game outcome was removed.

12. The gaming system of claim 11, wherein the non-bingo game outcomes are random number seeds.

13. The gaming system of claim 12, wherein the gaming device is further configured to:

provide the selected non-bingo game outcome to a random number generator; and process the selected non-bingo game outcome with the random number generator.

14. The gaming system of claim 13, wherein the gaming device is further configured to:

display the selected non-bingo game outcome as a combination of game symbols determined by the random number generator in response to processing the non-bingo game outcome.

15. The gaming system of claim 11, wherein the gaming device is further configured to provide the selected non-bingo game outcome only after each queue in the plurality of queues includes a predetermined number of non-bingo game outcomes, wherein the predetermined number of non-bingo game outcomes may vary from queue to queue.

16. A method comprising:

generating, with a computing device, a plurality of non-bingo game outcomes, each non-bingo game outcome associated with a payout amount;

forming a plurality of queues in a memory, each queue corresponding with a different payout amount, the plurality of queues including a first queue corresponding with a first payout amount;

assigning each generated non-bingo game outcome to a queue in the plurality of queues based on the payout amount associated with the non-bingo game outcome; and receiving a request for a non-bingo game outcome, the request including information indicating a bingo payout amount corresponding with the first payout amount; and providing a non-bingo game outcome from the first queue before each queue in the plurality of queues reaches a predetermined number of non-bingo game outcomes, wherein the predetermined number of non-bingo game outcomes may vary from queue to queue.

17. A method comprising:

generating, with a computing device, a plurality of non-bingo game outcomes, each non-bingo game outcome associated with a payout amount;

forming a plurality of queues in a memory, each queue corresponding with a different payout amount, the plurality of queues including a first queue corresponding with a first payout amount;

assigning each generated non-bingo game outcome to a queue in the plurality of queues based on the payout amount associated with the non-bingo game outcome; and receiving a request for a non-bingo game outcome, the request including information indicating a bingo payout amount corresponding with the first payout amount; and providing a non-bingo game outcome from the first queue after the first queue reaches a predetermined number of non-bingo game outcomes but before other queues in the plurality of queues reach predetermined numbers of bingo game outcomes, wherein the predetermined number of non-bingo game outcomes for each queue may vary from queue to queue.

18. A computer program stored in a non-transitory machine-readable medium, the computer program configured to control a gaming device to:

generate a plurality of non-bingo game outcomes, each non-bingo game outcome associated with a payout amount;

form a plurality of queues in a memory, each queue corresponding with a different payout amount, the plurality of queues including a first queue corresponding with a first payout amount;

assign each generated non-bingo game outcome to a queue in the plurality of queues based on the payout amount associated with the non-bingo game outcome; and receive a request for a non-bingo game outcome, the request including information indicating a bingo payout amount corresponding with the first payout amount; and provide a non-bingo game outcome from the first queue before each queue in the plurality of queues reaches a predetermined number of non-bingo game outcomes, wherein the predetermined number of non-bingo game outcomes may vary from queue to queue.

19. A computer program stored in a non-transitory machine-readable medium, the computer program configured to control a gaming device to:

generate a plurality of non-bingo game outcomes, each non-bingo game outcome associated with a payout amount;

form a plurality of queues in a memory, each queue corresponding with a different payout amount, the plurality of queues including a first queue corresponding with a first payout amount;

assign each generated non-bingo game outcome to a queue in the plurality of queues based on the payout amount associated with the non-bingo game outcome; and receive a request for a non-bingo game outcome, the request including information indicating a bingo payout amount corresponding with the first payout amount; and provide a non-bingo game outcome from the first queue after the first queue reaches a predetermined number of non-bingo game outcomes but before other queues in the plurality of queues reach predetermined numbers of bingo game outcomes, wherein the predetermined number of non-bingo game outcomes for each queue may vary from queue to queue.

20. A gaming system, the gaming system comprising:

one or more gaming machines; and a gaming device, wherein the gaming device is configured to:

generate a plurality of non-bingo game outcomes, each non-bingo game outcome associated with a payout amount;

form a plurality of queues in a memory, each queue corresponding with a different payout amount, the plurality of queues including a first queue corresponding with a first payout amount;

assign each generated non-bingo game outcome to a queue in the plurality of queues based on the payout amount associated with the non-bingo game outcome; and receive a request for a non-bingo game outcome, the request including information indicating a bingo payout amount corresponding with the first payout amount; and provide a non-bingo game outcome from the first queue before each queue in the plurality of queues reaches a predetermined number of non-bingo game outcomes, wherein the predetermined number of non-bingo game outcomes may vary from queue to queue.

21. A gaming system, the gaming system comprising:

one or more gaming machines; and a gaming device, wherein the gaming device is configured to:

generate a plurality of non-bingo game outcomes, each non-bingo game outcome associated with a payout amount;

form a plurality of queues in a memory, each queue corresponding with a different payout amount, the plurality of queues including a first queue corresponding with a first payout amount;

assign each generated non-bingo game outcome to a queue in the plurality of queues based on the payout amount associated with the non-bingo game outcome; and receive a request for a non-bingo game outcome, the request including information indicating a bingo payout amount corresponding with the first payout amount; and provide a non-bingo game outcome from the first queue after the first queue reaches a predetermined number of non-bingo game outcomes but before other queues in the plurality of queues reach predetermined numbers of bingo game outcomes, wherein the predetermined number of non-bingo game outcomes for each queue may vary from queue to queue.

* * * * *